(12) United States Patent
Wang et al.

(10) Patent No.: US 11,671,884 B2
(45) Date of Patent: Jun. 6, 2023

(54) CONNECTION REESTABLISHMENT METHOD AND APPARATUS

(71) Applicant: HUAWEI TECHNOLOGIES CO., LTD., Guangdong (CN)

(72) Inventors: Rui Wang, Shanghai (CN); Li Hu, Shanghai (CN); Mingzeng Dai, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 17/245,183

(22) Filed: Apr. 30, 2021

(65) Prior Publication Data

US 2021/0250826 A1    Aug. 12, 2021

Related U.S. Application Data

(63) Continuation of application No. PCT/CN2019/115140, filed on Nov. 1, 2019.

(30) Foreign Application Priority Data

Nov. 2, 2018 (CN) .......................... 201811303693.6

(51) Int. Cl.
*H04W 36/00* (2009.01)
*H04W 76/19* (2018.01)
(Continued)

(52) U.S. Cl.
CPC ....... *H04W 36/0079* (2018.08); *H04L 9/0891* (2013.01); *H04W 12/02* (2013.01);
(Continued)

(58) Field of Classification Search
CPC ......... H04W 36/0079; H04W 36/0038; H04W 76/19; H04W 12/02; H04W 12/04; H04L 9/0891
(Continued)

(56) References Cited

U.S. PATENT DOCUMENTS

2013/0208699 A1* 8/2013 Hakkinen ............. H04W 76/38
370/331

FOREIGN PATENT DOCUMENTS

CN    102340774 A    2/2012
CN    106658492 A    5/2017
(Continued)

OTHER PUBLICATIONS

Office Action issued in Chinese Application No. 201811303693.6 dated Jun. 2, 2021, 6 pages.
(Continued)

Primary Examiner — Joel Ajayi
(74) Attorney, Agent, or Firm — Fish & Richardson P.C.

(57) ABSTRACT

The present disclosure relates to connection reestablishment methods and apparatus. In one example method, when a handover fails, a terminal reverts back to a source configuration, and obtains a selected cell. The terminal sends a connection reestablishment request to a selected radio access network device. The terminal receives a first message from the selected radio access network device, where the first message includes indication information used to indicate to derive an access network key based on a core network key. The terminal obtains a first core network key based on the indication information, and derives a first access network key based on the first core network key. The terminal communicates with the selected radio access network device by using the first access network key.

6 Claims, 11 Drawing Sheets

(51) Int. Cl.
    *H04L 9/08*     (2006.01)
    *H04W 12/02*     (2009.01)
    *H04W 12/04*     (2021.01)

(52) U.S. Cl.
    CPC ....... *H04W 12/04* (2013.01); *H04W 36/0038* (2013.01); *H04W 76/19* (2018.02); *H04L 2209/80* (2013.01)

(58) Field of Classification Search
    USPC ........................................................ 455/437
    See application file for complete search history.

(56) References Cited

FOREIGN PATENT DOCUMENTS

| | | |
|---|---|---|
| CN | 107196920 A | 9/2017 |
| CN | 107708113 A | 2/2018 |
| CN | 108632022 A | 10/2018 |
| WO | 2017129288 A1 | 8/2017 |

OTHER PUBLICATIONS

Extended European Search Report issued in European Application No. 19879259.0 dated Nov. 12, 2021, 14 pages.

Huawei, HiSilicon, "Correction for restablishmentto the target cell," 3GPP TSG-RAN WG2 Meeting #104, R2-1817843, Spokane, USA, Dec. 2-16, 2018, 4 pages.

Huawei, HiSilicon, "Correction for handover failure (T304 expiry or Inability to comply with RRC Reconfiguration)," 3GPP TSG-RAN WG2 Meeting #104, R2-1817841, Spokane, WA, USA, Nov. 12-16, 2018, 4 pages.

Huawei, HiSilicon, "Discussion on error and key handling on UE for Reestablishment Procedure in case of N2 handover failure," 3GPP TSG-RAN WG2#104, R2-1817842, Spokane, USA, Nov. 12-16, 2018, 9 pages.

ZTE Corporation, Sanechips, "Reestablishment security framework," 3GPP TSG-RAN WG2 Meeting#103, R2-1811487, Gothenburg, Sweden, Aug. 20-24, 2018, 6 pages.

3GPP TS 36.331 V15.3.0 (Sep. 2018), "3rd Generation Partnership Project; Technical Specification Group Radio Access Network; Evolved Universal Terrestrial Radio Access (E-UTRA); Radio Resource Control (RRC); Protocol specification (Release 15)," Sep. 2018, 918 pages.

3GPP TS 36.304 V15.1.0 (Sep. 2018), "3rd Generation Partnership Project; Technical Specification Group Radio Access Network; Evolved Universal Terrestrial Radio Access (E-UTRA); User Equipment (UE) procedures in idle mode (Release 15)," Sep. 2018, 55 pages.

PCT International Search Report and Written Opinion in International Application No. PCT/CN2019/115140, dated Feb. 5, 2020, 13 pages.

\* cited by examiner

CONNECTION REESTABLISHMENT METHOD AND APPARATUS

CROSS-REFERENCE TO RELATED APPLICATIONS

This application is a continuation of International Application No. PCT/CN2019/115140, filed on Nov. 1, 2019, which claims priority to Chinese Patent Application No. 201811303693.6, filed on Nov. 2, 2018. The disclosures of the aforementioned applications are hereby incorporated by reference in their entireties.

TECHNICAL FIELD

This application relates to the field of communications technologies, and in particular, to a connection reestablishment method and apparatus.

BACKGROUND

In a 5th generation communication technology (the 5 Generation Mobile Communication Technology, 5G) system, a handover procedure of user equipment (UE) includes: directly preparing for a handover between a source base station and a target base station and triggering the handover by the source base station based on an interface between a core network device and the target base station.

In a scenario in which a source base station triggers a handover based on an interface between a core network device and a target base station after UE accesses the target base station, the core network device may update a core network key. In this way, the UE derives a new access network key based on an updated core network key, and communicates with the target base station by using the new access network key. If the UE handover fails, a radio resource control (RRC) connection reestablishment procedure may be triggered.

According to an existing radio resource control (RRC) connection reestablishment procedure, the UE has reverted back to a source configuration before performing connection reestablishment. However, in a scenario in which a source base station in a 5G system triggers a handover based on an interface between a base station and a core network, if a core network device updates a core network key, an access network key of a selected base station (which may be a target base station) is different from an access network key of a terminal, a core network key of a terminal is different from a core network key of the core network device, or an access network key of a selected base station (when the selected base station is neither a source base station nor a target base station) is different from an access network key of the core network device. Consequently, RRC connection reestablishment fails.

SUMMARY

This application provides a connection reestablishment method and apparatus, to resolve a connection reestablishment failure in a scenario in which a core network key is updated, and a handover of a terminal fails.

To achieve the foregoing objective, the following technical solutions are used in the embodiments of this application.

According to a first aspect, a connection reestablishment method is provided. The connection reestablishment method is used in an application scenario in which a core network device updates a source core network key to a first core network key in a process in which a terminal is handed over from a source radio access network device to a target radio access network device. Specifically, the connection reestablishment method is as follows: When a reconfiguration fails, or a handover fails, the terminal reverts back to a source configuration and obtains a selected cell. Then, the terminal sends a connection reestablishment request to a selected radio access network device that provides a service for the selected cell. Correspondingly, the terminal receives a first message that is from the selected radio access network device, and that includes indication information, where the indication information is used to indicate to derive an access network key based on a core network key. Further, the terminal device obtains the first core network key based on the indication information, and derives a first access network key based on the first core network key. In this way, the terminal can communicate with the selected radio access network device by using the first access network key.

In this application, the terminal obtains the first core network key based on the received indication information sent by the selected radio access network device, and derives the first access network key based on the first core network key. In this way, the key of the terminal is the same as the key of the core network device. In addition, the selected radio access network device in this application can also obtain the first access network key, thereby implementing consistency of the keys of the terminal, the core network device, and the selected radio access network device, and implementing completion of connection reestablishment.

Optionally, in a possible implementation of this application, that the terminal reverts back to a source configuration includes: An access network key of the terminal is reverted back to a source access network key, where the source access network key herein is derived by the terminal based on the source core network key. In addition, the connection reestablishment method provided in this application further includes: An access stratum (AS) of the terminal sends, to a non-access stratum (NAS) of the terminal, an indication message used to indicate to revert the core network key back to the source core network key; and correspondingly, the NAS of the terminal reverts the first core network key back to the source core network key.

In this application, that the terminal reverts back to a source configuration may be that the access network key of the terminal is reverted back to the source access network key, and the core network key of the terminal is reverted back to the source core network key, or may be that the access network key of the terminal is reverted back to the source access network key, and the core network key of the terminal remains as the first core network key.

Optionally, in another possible implementation of this application, in a scenario in which the access network key of the terminal is reverted back to the source access network key and the core network key of the terminal is reverted back to the source core network key, the first message is a connection reestablishment message or a reconfiguration message, the indication information is a non-access stratum container (NAS container), and the non-access stratum container is obtained by the selected radio access network device from the core network device. Correspondingly, a method in which "the terminal obtains the first core network key based on the indication information" is that the terminal obtains the first core network key through derivation based on the NAS container.

In a scenario in which the core network key of the terminal is reverted back to the source core network key, the terminal needs to obtain the NAS container, to derive the first core network key, and further derive a new access network key based on the first core network key, thereby implementing consistency of the key of the terminal and the key of the core network device.

Optionally, in another possible implementation of this application, if the first message is a reconfiguration message, before receiving the first message from the selected radio access network device, the terminal further receives a connection reestablishment message that is sent by the selected radio access network device, and that includes a first derivation parameter, and derives a second access network key based on the first derivation parameter, where the first derivation parameter is used to indicate to derive the second access network key based on the source access network key or a third derivation parameter; and after deriving the second access network key, the terminal sends, to the selected radio access network device, a connection reestablishment complete message on which security protection is performed by using the second access network key.

According to the connection reestablishment method provided in this application, a connection between the terminal and the selected radio access network device may be first implemented, and then the keys of the selected radio access network device and the terminal are updated.

Optionally, in another possible implementation of this application, in a scenario in which that the terminal reverts back to a source configuration means that the access network key of the terminal is reverted back to the source access network key, and the core network key of the terminal remains as the first core network key, the first message is a connection reestablishment message, and the indication information includes at least one of the first derivation parameter and a key change indicator.

According to a second aspect, a communications apparatus is provided. The communications apparatus can implement functions in any one of the first aspects and the possible implementations of the first aspect. These functions may be implemented by hardware, or may be implemented by hardware executing corresponding software. The hardware or software includes one or more modules corresponding to the functions.

In a possible implementation of this application, the communications apparatus may include a processing unit, a sending unit, and a receiving unit. The processing unit, the sending unit, and the receiving unit may perform corresponding functions in the connection reestablishment method according to any one of the first aspects and the possible implementations of the first aspect. For example, the processing unit is configured to: when a handover fails, revert, by a terminal, back to a source configuration, and obtain a selected cell. The sending unit is configured to send a connection reestablishment request to a selected radio access network device, where the selected radio access network device provides a service for the selected cell. The receiving unit is configured to receive a first message from the selected radio access network device, where the first message includes indication information, and the indication information is used to indicate to derive an access network key based on a core network key. The processing unit is further configured to: obtain a first core network key based on the indication information, and derive a first access network key based on the first core network key; and further configured to communicate with the selected radio access network device by using the first access network key.

According to a third aspect, a communications apparatus is provided. The communications apparatus includes a processor, and the processor is configured to be coupled to a memory, and read and execute instructions in the memory, to implement the connection reestablishment method according to any one of the first aspect and the possible implementations of the first aspect.

Optionally, the communications apparatus may further include a memory, and the memory is configured to store program instructions and data of the communications apparatus. Further, optionally, the communications apparatus may further include a transceiver. The transceiver is configured to perform, under control of the processor of the communications apparatus, the step of receiving and sending data, signaling, or information in the connection reestablishment method according to any one of the first aspect and the possible implementations of the first aspect, for example, receiving a first message, or sending a connection reestablishment request.

Optionally, the communications apparatus may be a terminal, or may be an apparatus as a part in a terminal, for example, a chip system in the terminal. The chip system is configured to support the terminal in implementing a function in any one of the first aspects and the possible implementations of the first aspect, for example, receiving, sending, or processing data and/or information in the foregoing connection reestablishment method. The chip system includes a chip, or may further include another discrete component or circuit structure.

According to a fourth aspect, a computer-readable storage medium is further provided. The computer-readable storage medium stores instructions. When the instructions are run on a communications apparatus, the communications apparatus is enabled to perform the connection reestablishment method according to any one of the first aspects and the possible implementations of the first aspect.

According to a fifth aspect, a computer program product including instructions is further provided. When the computer program product is run on a communications apparatus, the communications apparatus is enabled to perform the connection reestablishment method according to any one of the first aspects and the possible implementations of the first aspect.

It should be noted that all or some of the foregoing instructions may be stored in a first computer storage medium. The first computer storage medium may be packaged together with a processor, or the first computer storage medium and a processor may be separately packaged. This is not specifically limited in this application.

In this application, for detailed descriptions of the second aspect, the third aspect, the fourth aspect, the fifth aspect, and various implementations of the second aspect, the third aspect, the fourth aspect, and the fifth aspect, refer to the detailed descriptions of the first aspect and the implementations of the first aspect. In addition, for beneficial effects of the second aspect, the third aspect, the fourth aspect, the fifth aspect, and the various implementations of the second aspect, the third aspect, the fourth aspect, and the fifth aspect, refer to the analysis of the beneficial effects of the first aspect and the implementations of the first aspect. Details are not described herein again.

According to a sixth aspect, a connection reestablishment method is provided. The connection reestablishment method is used in an application scenario in which a core network device updates a source core network key to a first core network key in a process in which a terminal is handed over from a source radio access network device to a target radio access network device. Specifically, the connection reestablishment method is as follows: A selected radio access network device receives a connection reestablishment request from the terminal, and obtains key reference information, where the key reference information is a first access network key derivation parameter, or is a first access network key derivation parameter and a NAS container; and the first radio access network key derivation parameter is obtained based on the first core network key. Then, the selected radio access network device derives a first access network key based on the first access network key derivation parameter, and sends, to the terminal, a first message including indication information used to indicate to derive an access network key based on a core network key, where the indication information is the NAS container, or at least one of a first derivation parameter and a key change indicator, where the key change indicator is used to indicate to derive the access network key based on the core network key, and the first derivation parameter belongs to the first access network key derivation parameter. The selected radio access network device provides a service for a selected cell, and the selected cell is a cell selected by the terminal after a handover fails.

In this application, the selected radio access network device obtains the first access network key, and sends the first message, including the indication information, to the terminal. In this way, the terminal may also obtain the first core network key, and derive the first access network key based on the first core network key, thereby implementing consistency of the keys of the terminal, the core network device, and the selected radio access network device, and implementing completion of connection reestablishment.

Optionally, in a possible implementation of this application, if the selected radio access network device and the source radio access network device are a same device, the method in which "a selected radio access network device obtains key reference information" is as follows: The selected radio access network device receives the key reference information from the core network device.

In a scenario in which the selected radio access network device and the source radio access network device are a same device, the selected radio access network device may directly obtain the key reference information from the core network device.

Optionally, in a possible implementation of this application, if the selected radio access network device and the target radio access network device are a same device, the method in which "a selected radio access network device obtains key reference information" is as follows: The selected radio access network device obtains the key reference information from locally stored key information, where the locally stored key information includes the first access network key derivation parameter, the NAS container, and the key change indicator that are from the core network device.

In the handover process, the target radio access network device has obtained the key reference information from the core network device. Therefore, in a scenario in which the selected radio access network device and the target radio access network device are a same device, the selected radio access network device may directly obtain the key reference information from a local storage.

Optionally, in another possible implementation of this application, the locally stored key information further includes a second access network key derivation parameter from the core network device, the second access network key derivation parameter includes the first derivation parameter and a second derivation parameter, and the first derivation parameter is used to indicate the terminal to derive the access network key based on a source access network key or a third derivation parameter.

Optionally, in another possible implementation of this application, if the selected radio access network device is another radio access network device different from the source radio access network device and the target radio access network device, the selected radio access network device is connected to the core network device. In this case, a method in which "the selected radio access network device obtains key reference information" is as follows: The selected radio access network device receives a path update response message from the core network device, where the path update response message includes the key reference information.

According to a seventh aspect, a communications apparatus is provided. The communications apparatus can implement functions in any one of the sixth aspects and the possible implementations of the sixth aspect. The functions may be implemented by hardware, or may be implemented by hardware executing corresponding software. The hardware or software includes one or more modules corresponding to the functions.

In a possible implementation of this application, the communications apparatus may include a receiving unit, a processing unit, and a sending unit. The receiving unit, the processing unit, and the sending unit may perform corresponding functions in the connection reestablishment method according to any one of the sixth aspects and the possible implementations of the sixth aspect. For example, the receiving unit is configured to receive a connection reestablishment request from a terminal, and a selected radio access network device provides a service for a selected cell, where the selected cell is a cell selected by the terminal after a handover fails. The processing unit is configured to obtain key reference information, where the key reference information is a first access network key derivation parameter, or is a first access network key derivation parameter and a non-access stratum container (NAS container); and the first radio access network key derivation parameter is obtained based on a first core network key; and is configured to derive a first access network key based on the first access network key derivation parameter. The sending unit is configured to send a first message including indication information to the terminal, where the indication information is used to indicate to derive an access network key based on a core network key; and the indication information is the NAS container, or at least one of a first derivation parameter and a key change indicator, where the key change indicator is used to indicate to derive the access network key based on the core network key, and the first derivation parameter belongs to the first access network key derivation parameter.

According to an eighth aspect, a communications apparatus is provided. The communications apparatus includes a processor, and the processor is configured to be coupled to a memory, and read and execute instructions in the memory, to implement the connection reestablishment method according to any one of the sixth aspect and the possible implementations of the sixth aspect.

Optionally, the communications apparatus may further include a memory, and the memory is configured to store program instructions and data of the communications apparatus. Further, optionally, the communications apparatus may further include a transceiver. The transceiver is configured to perform, under control of the processor of the communications apparatus, the step of receiving and sending data, signaling, or information in the connection reestablishment method according to any one of the sixth aspect and the possible implementations of the sixth aspect, for example, receiving a connection reestablishment request, or sending a first message.

Optionally, the communications apparatus may be a selected radio access network device, or may be an apparatus as a part in the selected radio access network device, for example, a chip system in the selected radio access network device. The chip system is configured to support the selected radio access network device in implementing a function in any one of the sixth aspects and the possible implementations of the sixth aspect, for example, receiving, sending, or processing data and/or information in the foregoing connection reestablishment method. The chip system includes a chip, or may further include another discrete component or circuit structure.

According to a ninth aspect, a computer-readable storage medium is further provided. The computer-readable storage medium stores instructions. When the instructions are run on a communications apparatus, the communications apparatus is enabled to perform the connection reestablishment method according to any one of the sixth aspect and the possible implementations of the sixth aspect.

According to a tenth aspect, a computer program product including instructions is further provided. When the computer program product is run on a communications apparatus, the communications apparatus is enabled to perform the connection reestablishment method according to any one of the sixth aspect and the possible implementations of the sixth aspect.

It should be noted that all or some of the foregoing instructions may be stored in a first computer storage medium. The first computer storage medium may be packaged together with a processor, or the first computer storage medium and a processor may be separately packaged. This is not specifically limited in this application.

In this application, for detailed descriptions of the seventh aspect, the eighth aspect, the ninth aspect, the tenth aspect, and various implementations of the seventh aspect, the eighth aspect, the ninth aspect, and the tenth aspect, refer to the detailed descriptions of the sixth aspect and the implementations of the sixth aspect. In addition, for beneficial effects of the seventh aspect, the eighth aspect, the ninth aspect, the tenth aspect, and the various implementations of the seventh aspect, the eighth aspect, the ninth aspect, and the tenth aspect, refer to the analysis of the beneficial effects of the sixth aspect and the implementations of the sixth aspect. Details are not described herein again.

In this application, a name of the communications apparatus does not constitute any limitation to devices or functional modules. In actual implementation, the devices or the functional modules may have other names. The devices or the functional modules fall within the scopes of the claims of this application and equivalent technologies thereof, provided that functions of the devices or the functional modules are similar to those in this application.

These aspects and other aspects of this application are clearer and easier to understand in the following descriptions.

DESCRIPTION OF EMBODIMENTS

In the embodiments of this application, the word such as "example" or "for example" is used to give an example, an illustration, or a description. Any embodiment or design scheme described as an "example" or "for example" in the embodiments of this application should not be explained as being preferable or having more advantages than another embodiment or design scheme. Exactly, use of the word "example", "for example", or the like is intended to present a related concept in a specific manner.

The following terms, "first" and "second," are merely intended for the purpose of description, and shall not be understood as an indication or implication of relative importance or implicit indication of a quantity of indicated technical features. Therefore, a feature limited by "first" or "second" may explicitly or implicitly include one or more features. In the descriptions of the embodiment of this application, unless otherwise stated, "a plurality of" means two or more than two.

Mobility is a main feature of a wireless communications system, and is mainly implemented through cell selection in idle mode and handover in connected mode. In connected mode, a signal strength contrast between cells constantly changes in a handover process due to the complexity of multi-cell coverage in some areas. Consequently, there is a relatively high probability that a handover fails. In a long term evolution (LTE) system, user equipment (UE) needs to use a radio resource control (RRC) connection reestablishment procedure to ensure service continuity.

In this application, an evolved node base station (eNB) in the LTE system is referred to as an LTE eNB.

Figure 1:
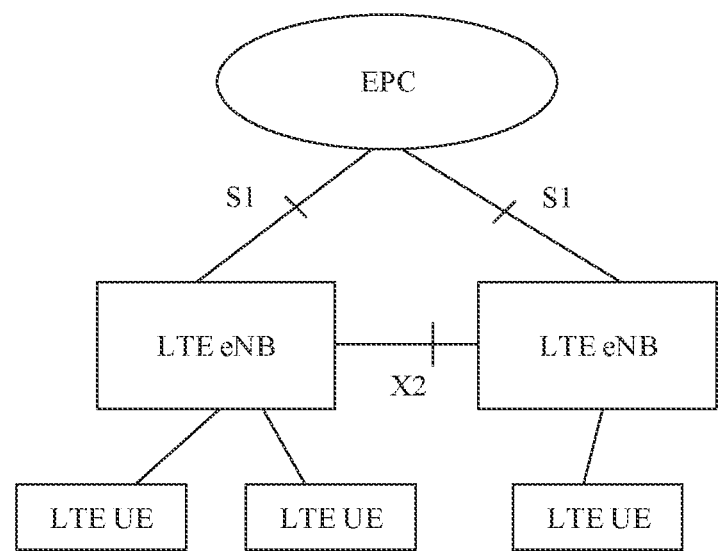
FIG. 1 shows a network architecture in a conventional LTE system.

In a conventional LTE system, an LTE eNB accesses an evolved packet core (EPC) network through an S1 interface, and different LTE eNBs are connected to each other through an X2 interface. Each LTE eNB is connected to at least one LTE UE. FIG. 1 shows a network architecture in a conventional LTE system. In actual application, the LTE eNB and the LTE UE are wirelessly connected. To conveniently and intuitively represent connection relationships between devices, solid lines are used for illustration in FIG. 1.

When UE moves between two LTE cells, the UE in connected mode (RRC connected mode) triggers an intra-LTE handover (HO) procedure, and the UE in idle mode (RRC Idle mode) triggers a cell selection procedure. During the intra-LTE handover, a core network accessed by the UE does not change, and a radio access technology (RAT) does not change either. A source configuration used by the UE in a source cell may be used in a cell of a same standard, and a base station that provides a service for the source cell (referred to as a source base station for short) and a base station that provides a service for a target cell (referred to as a target base station for short) has a context of the UE. When UE moves between an LTE cell and a cell of another standard (for example, a 3rd generation communication technology (3G)/2nd generation communication technology (2G)), the UE in connected mode triggers an inter-radio access technology (Inter-RAT) handover procedure, and the UE in idle mode initiates a cell selection procedure. During the inter-RAT handover, a core network changes, and a RAT also changes. A source configuration used by the UE in a source cell cannot be used in cells of different standards, a source base station has a context related to the UE in a source core network, and a target base station has a context related to the UE in a target core network.

If the UE handover fails, an RRC connection reestablishment procedure may be triggered. Correspondingly, the UE performs cell selection. Specifically, before the UE determines to reselect a cell, the UE reverts back to a configuration (referred to as the source configuration for short) used by the UE in the source cell. If the cell selected by the UE (referred to as a first cell) has a same standard as that of the source cell, the UE sends an RRC connection reestablishment request message to a base station that provides a service for the first cell (referred to as a selected base station for short). It can be learned from the foregoing description that, if the first cell and the source cell have a same standard, the selected base station also has the context of the UE. In this way, after the UE sends the RRC connection reestablishment request message to the selected base station, the selected base station can pass a security check of the UE, to restore the RRC connection of the UE. If the standard of the first cell is different from that of the source cell, the UE is handed over from the RRC connected mode, that is, the UE does not send an RRC connection reestablishment request message to the selected base station.

As communications technologies develop, the LTE eNB may evolve into a next generation LTE base station (ng-eNB). The ng-eNB provides a radio transmission resource for a terminal by using an evolved universal terrestrial radio access (E-UTRA) technology. The ng-eNB may provide a service of a 5th generation core network (5GCN) for the terminal, or may provide a service of an EPC for the terminal. During actual deployment, the ng-eNB may be connected to only the 5GCN/EPC, or may be connected to both the 5GCN and the EPC. The 5GCN may also be referred to as a 5GC.

An access network (RAN) in a 5G system is referred to as a next generation RAN (NG-RAN), and an NG-RAN node includes an ng-eNB and a gNB (base stations in the 5G system). The gNB provides a radio transmission resource for 5G UE by using a new radio (NR) technology, and provides a 5GC service for the 5G UE. Subsequently, UE in the LTE system is referred to as LTE UE, UE in the 5G system is referred to as 5G UE, a cell in which a gNB provides a 5GC service is referred to as an NR cell, and a cell in which an ng-eNB provides a service is referred to as an ng-eNB cell.

Figure 2:
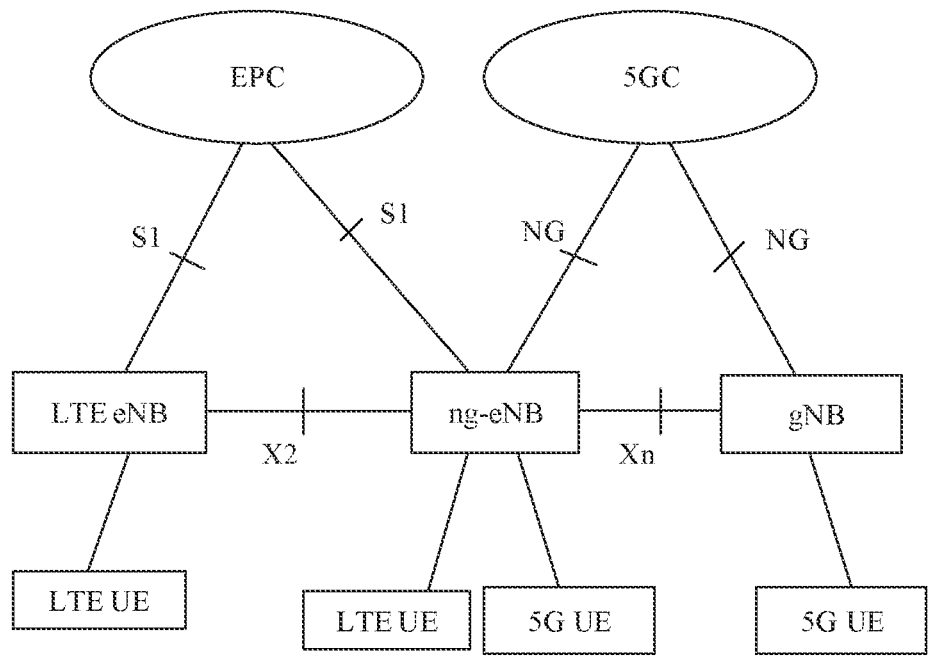
FIG. 2 is a schematic structural diagram of a network in which a 4G system and a 5G system coexist.

FIG. 2 shows a structure of a network in which a 4G system and a 5G system coexist. As shown in FIG. 2, an ng-eNB may access an EPC through an S1 interface, and may further access a 5GC through another corresponding interface (represented by NG in FIG. 2). 5G UE connected to the ng-eNB may access the 5GC via the ng-eNB. LTE UE connected to the ng-eNB may access the EPC via the ng-eNB. An LTE eNB is connected, through an X2 interface, to the ng-eNB connected to the EPC, and the ng-eNB is connected to an NR gNB through an Xn interface. Likewise, in actual application, connections between the foregoing plurality of devices may be wireless connections. To conveniently and intuitively represent connection relationships between the devices, solid lines are used for illustration in FIG. 2.

In the embodiments of this application, a cell in which the ng-eNB provides a 5GC service is referred to as an E-UTRA-5GC cell, and a cell in which the ng-eNB or the LTE eNB provides an EPC service is referred to as an E-UTRA-EPC cell.

When a terminal moves between an ng-eNB cell and an NR gNB cell, the terminal in connected mode triggers a handover procedure. The handover procedure includes an inter-core-network (inter-system inter-RAT) handover procedure and a 5G intra-system (intra-system inter-RAT) handover procedure. In the inter-system intra-RAT handover, the core network changes, but the RAT does not change. In the intra-system inter-RAT handover, the core network does not change, but the RAT changes. Correspondingly, the handover procedure may be that a handover is directly prepared between a source base station and a target base station, or that a handover may be triggered based on an interface (for example, an S1 interface or an NG interface) between a base station and a core network device.

In a scenario in which a handover is directly prepared between a source base station and a target base station, or in a scenario in which a handover is triggered based on an interface between a base station and a core network device, if a handover of the terminal fails, the terminal may perform an RRC connection reestablishment procedure on the target base station. Specifically, in the handover preparation process, the source base station sends a handover preparation message to the target base station, where the handover preparation message includes a security context of the terminal, for example, a physical cell identifier (PCI) of a source cell, a cell radio network temporary identifier (C-RNTI) of the source cell, security parameter information VarShortMAC-Input determined by the source base station based on an ID of a target cell, and information about at least one reestablished cell. In this way, when the terminal initiates reestablishment in a cell under the target base station, because the target base station obtains reestablishment related information of the terminal, the target base station may perform a security check on the terminal, to allow successful reestablishment of the terminal.

A core access and mobility management function (AMF) entity is a control plane network element in the 5G system. The AMF is connected to the NR gNB/ng-eNB through the NG interface, or may be directly connected to the 50 UE through another corresponding interface.

To ensure data security, communication between any two devices in a communications system needs to be performed based on a key. The following describes the keys involved in the 5G system.

For the terminal, a non-access stratum (NAS) is responsible for deriving a core network key (for example, a key for AMF (KAMF)). During initial security activation, an access stratum (AS) derives an initial access network key (for example, a KgNB or KeNB) and a next hop parameter (NH) based on the KAMF. Subsequently, in a handover process, the AS derives a new access network key based on a next hop chaining counter parameter (NCC) and the NH, or based on an NCC and the initial access network key. The terminal derives, based on the new access network key, an AS key used for RRC encryption, RRC integrity protection (IP for short), DRB encryption, and DRB integrity protection, and communicates with an access network device by using the AS key.

From the perspective of a network, the AMF is responsible for deriving a core network key (for example, a KAMF), and deriving an initial access network key (for example, a KgNB and KeNB) and an NH based on the core network key. During initial security activation, the AMF sends the initial access network key, the NH, and an NCC to a base station. The base station derives a target access network key based on the initial access network key; derives, based on the target access network key, an AS key used for RRC encryption, RRC integrity protection, DRB encryption, and DRB integrity protection; and communicates with UE by using the AS key.

Generally, in a scenario in which the handover is directly prepared between a source base station and a target base station in a 5G system, the source base station is responsible for deriving a target base station key (for example, a KgNB or KeNB), and sending the target base station key and an NCC to the target base station through an interface (for example, an X2 interface or an Xn interface) between base stations. The target base station derives an AS key based on the target base station key. In addition, the source base station generates a handover command, including the NCC, and sends the handover command to a terminal. The terminal derives the target base station key based on the NCC, a locally stored NH, a source base station key, and the like; and derives, based on the target base station key, the AS key used for communication with the target base station.

In a scenario in which a handover is triggered based on an interface (for example, an S1 interface or an NG interface) between a base station and a core network device in a 5G system, a source base station sends a handover command including an NCC to a terminal. Correspondingly, the terminal determines, based on the NCC, to derive a target base station key based on an NH. The core network device sends a handover request, including the NCC and the NH, to a target base station, and the target base station derives a target base station key based on the NH. Both of the target base station and the terminal derive an AS key based on the target base station key, and perform communication by using the AS key.

Optionally, in a scenario in which a handover is triggered based on an interface between a base station and a core network device in a 5G system, after the terminal accesses the target base station, the core network device may update a core network key (for example, a KAMF). In this way, the terminal derives a new access network key based on an updated core network key, and communicates with the target base station by using the new access network key.

Specifically, after receiving a handover request (HO request) sent by the source base station, a source core network device updates (rekeying) the KAMF, and sends a NAS container and a key change indicator to a target core network device or the target base station (in this case, the source core network device and the target core network device are a same device). After receiving the NAS container and the key change indicator, the target base station generates a handover command (HO command), including the NAS container and the key change indicator, and sends the handover command to the terminal via the source core network device and the source base station. After receiving the HO command, the terminal sends the NAS container to the NAS, so that the NAS derives a new KAMF based on the NAS container. Correspondingly, the AS of the terminal determines, based on the key change indicator, to derive a new access network key by using the new KAMF, to communicate with the target base station.

According to an existing RRC connection reestablishment procedure, the terminal has reverted back to a source configuration before performing the connection reestablishment. However, in a scenario in which a source base station in a 5G system triggers a handover based on an interface between a base station and a core network, if a core network device updates a core network key, an access network key of a selected base station (which may be a target base station) is different from an access network key of a terminal, or an access network key of a terminal is different from an access network key of the core network device, or an access network key of a selected base station (when the selected base station is neither a source base station nor a target base station) is different from an access network key of the core network device. Consequently, RRC connection reestablishment fails.

For this problem, the embodiments of this application provide a connection reestablishment method and apparatus. For an application scenario in which a core network device updates a source core network key to a first core network key in a process in which a terminal is handed over from a source radio access network device to a target radio access network device, a selected radio access network device derives a new access network key by obtaining a first access network key derivation parameter and first information; and the terminal may keep a core network key unchanged, and revert an access network key back to a source access network key; or may revert a core network key back to the source core network key, and revert an access network key back to a source access network key. The terminal communicates with the selected radio access network device, and a new access network key may also be derived, thereby implementing consistency of the keys of the terminal, the selected radio access network device, and the core network device, and implementing completion of connection reestablishment.

The connection reestablishment method provided in the embodiments of this application is applicable to the communications system shown in FIG. 2. With reference to FIG. 2, the source radio access network device/the target radio access network device/the selected radio access network device in the embodiments of this application may be an ng-eNB or an NR gNB, and the terminal may be NR UE.

The terminal in the embodiments of this application may be a mobile phone (a mobile phone 300 shown in FIG. 3), a tablet computer, a personal computer (PC), a personal digital assistant (PDA), a smartwatch, a netbook, a wearable electronic device, or the like. A specific form of the device is not particularly limited in the embodiments of this application.

Figure 3:
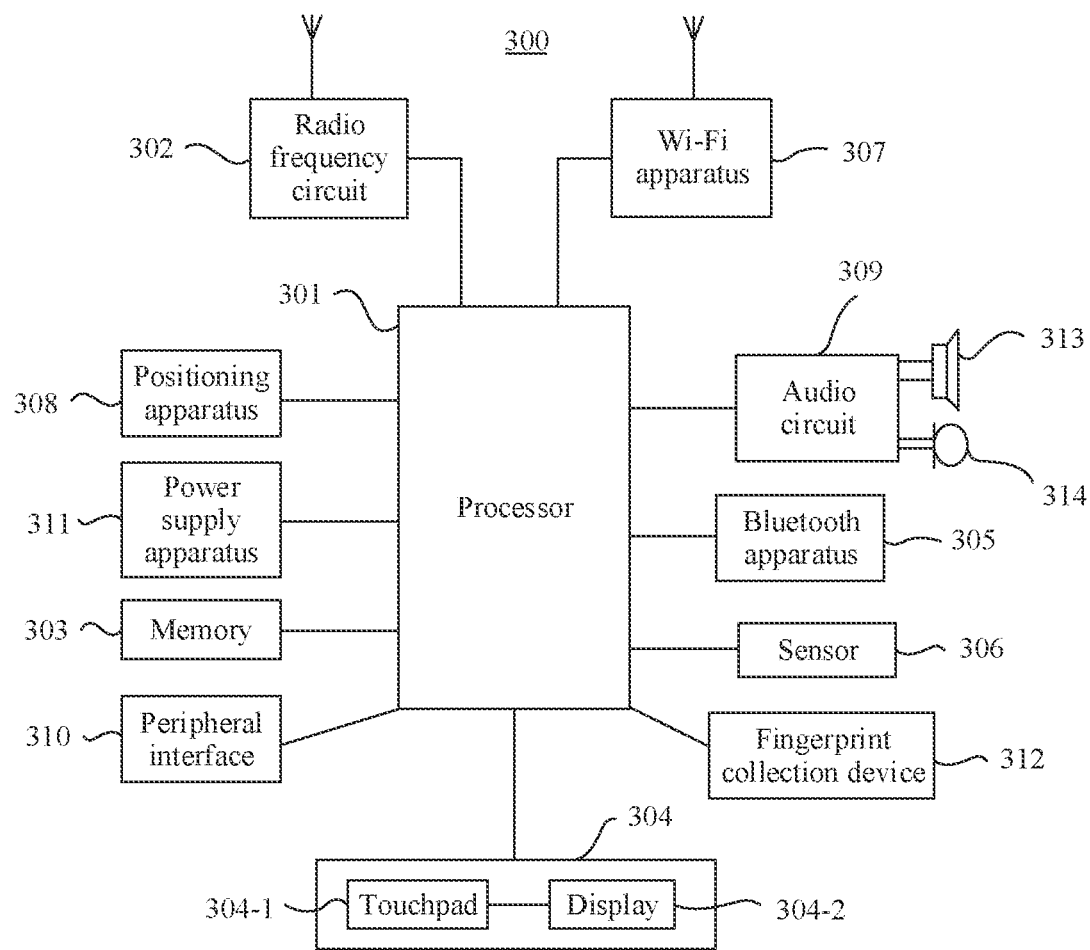
FIG. 3 is a schematic diagram of a hardware structure of a base station according to an embodiment of this application.

As shown in FIG. 3, the mobile phone 300 is used as an example of the foregoing terminal. The mobile phone 300 may specifically include: a processor 301, a radio frequency (RF) circuit 302, a memory 303, a touchscreen 304, a Bluetooth apparatus 305, one or more sensors 306, and a wireless fidelity (Wi-Fi) apparatus 307, a positioning apparatus 308, an audio circuit 309, a peripheral interface 310, a power apparatus 311, and another component. The components may communicate with each other by using one or more communications buses or signal cables (not shown in FIG. 3). A person skilled in the art may understand that a hardware structure shown in FIG. 3 does not constitute a limitation on the mobile phone, and the mobile phone 300 may include more or fewer components than those shown in the figure, or some components may be combined, or the mobile phone 300 may have different component arrangements.

The following describes in detail the components of the mobile phone 300 with reference to FIG. 3.

The processor 301 is a control center of the mobile phone 300, is connected to all parts of the mobile phone 300 via various interfaces and lines, and performs various functions of the mobile phone 300 and processes data by running or executing an application program stored in the memory 303 and invoking data stored in the memory 303. In some embodiments, the processor 301 may include one or more processing units. In some of the embodiments of this application, the processor 301 may further include a fingerprint verification chip, configured to verify a collected fingerprint.

The radio frequency circuit 302 may be configured to receive and send a radio signal in an information receiving/sending process or a call process. Particularly, after receiving downlink data from a base station, the radio frequency circuit 302 may send the downlink data to the processor 301 for processing, and sends related uplink data to the base station. Generally, the radio frequency circuit includes but is not limited to an antenna, at least one amplifier, a transceiver, a coupler, a low noise amplifier, a duplexer, and the like. In addition, the radio frequency circuit 302 may further communicate with another device through wireless communication. The wireless communication may use any communication standard or protocol, including but not limited to a global system for mobile communications, a general packet radio service, code division multiple access, wideband code division multiple access, long term evolution, an e-mail, a short message service, and the like.

The memory 303 is configured to store the application program and the data. The processor 301 performs various functions of the mobile phone 300 and processes data by running the application program and the data stored in the memory 303. The memory 303 mainly includes a program storage area and a data storage area. The program storage area may store an operating system, and an application program used for at least one function (for example, a sound playing function or an image processing function). The data storage area may store data (for example, audio data or a phone book) created based on the use of the mobile phone 300. In addition, the memory 303 may include a high-speed random access memory (RAM), and may further include a nonvolatile memory such as a magnetic disk storage component, a flash memory, or another volatile solid-state storage component. The memory 303 may store various operating systems such as an iOS operating system and an Android operating system. The memory 303 may be stand-alone, and is connected to the processor 301 via the communications bus; or the memory 303 may be integrated with the processor 301.

The touchscreen 304 may specifically include a touchpad 304-1 and a display 304-2.

The touchpad 304-1 may collect a touch event performed by a user of the mobile phone 300 on or near the touchpad 304-1 (for example, an operation performed by the user on the touchpad 304-1 or near the touchpad 304-1 by using any proper object such as a finger or a stylus), and send collected touch information to another component (for example, the processor 301). The touch event performed by the user near the touchpad 304-1 may be referred to as a floating touch. The floating touch may mean that the user does not need to directly touch the touchpad to select, move, or drag an object (for example, an icon), and the user only needs to be near a device to perform a desired function. In addition, the touchpad 304-1 may be implemented in a plurality of types such as a resistive type, a capacitive type, an infrared type, and a surface acoustic wave type.

The display (also referred to as a display screen) 304-2 may be configured to display information entered by the user or information provided for the user, and various menus of the mobile phone 300. The display 304-2 may be configured in a form such as a liquid crystal display or an organic light-emitting diode. The touchpad 304-1 may cover the display 304-2. After detecting a touch event on or near the touchpad 304-1, the touchpad 304-1 transfers the touch event to the processor 301 to determine a type of the touch event. Then, the processor 301 can provide corresponding visual output on the display 304-2 based on the type of the touch event. Although the touchpad 304-1 and the display 304-2 in FIG. 2 are used as two independent components to implement input and output functions of the mobile phone 300, in some embodiments, the touchpad 304-1 and the display 304-2 may be integrated to implement the input and output functions of the mobile phone 300. It may be understood that the touchscreen 304 is formed by stacking a plurality of layers of materials. In the embodiments of this application, only the touchpad (layer) and the display (layer) are displayed, and another layer is not recorded in this embodiment of this application. In addition, the touchpad 304-1 may be disposed on a front side of the mobile phone 300 in a form of a full panel, and the display 304-2 may also be disposed on the front side of the mobile phone 300 in a form of a full panel. Therefore, a frameless structure can be implemented for the front side of the mobile phone.

In addition, the mobile phone 300 may further have a fingerprint recognition function. For example, a fingerprint collection component 312 may be disposed on a back side (for example, below a rear-facing camera) of the mobile phone 300, or a fingerprint collection component 312 may be disposed on the front side (for example, below the touchscreen 304) of the mobile phone 300. For another example, a fingerprint collection component 312 may be disposed on the touchscreen 304 to implement a fingerprint recognition function. In other words, the fingerprint collection component 312 may be integrated with the touchscreen 304 to implement the fingerprint recognition function of the mobile phone 300. In this case, the fingerprint collection component 312 is disposed on the touchscreen 304, and may be a part of the touchscreen 304, or may be disposed on the touchscreen 304 in another manner. A main part of the fingerprint collection component 312 in this embodiment of this application is a fingerprint sensor. The fingerprint sensor may use any type of sensing technology, including but not limited to an optical sensing technology, a capacitive sensing technology, a piezoelectric sensing technology, an ultrasonic sensing technology, or the like.

The mobile phone 300 may further include the Bluetooth apparatus 305, configured to implement data exchange between the mobile phone 300 and another short-distance device (for example, a mobile phone or a smartwatch). In this embodiment of this application, the Bluetooth apparatus may be an integrated circuit, a Bluetooth chip, or the like.

The mobile phone 300 may further include at least one type of sensor 306, such as a light sensor, a motion sensor, and another sensor. Specifically, the light sensor may include an ambient light sensor and a proximity sensor. The ambient light sensor may adjust luminance of the display of the touchscreen 304 based on intensity of ambient light. The proximity sensor may power off the display when the mobile phone 300 is moved to an ear. As one type of the motion sensor, an accelerometer sensor may detect a value of acceleration in each direction (usually on three axes). The accelerometer sensor may detect a value and a direction of gravity when the accelerometer sensor is stationary, and may be used in an application for identifying a mobile phone posture (such as screen switching between a landscape mode and a portrait mode, a related game, or magnetometer posture calibration), a function related to vibration recognition (such as a pedometer or a knock), and the like. For another sensor such as a gyroscope, a barometer, a hygrometer, a thermometer, or an infrared sensor that may be further disposed in the mobile phone 300, details are not described herein.

The Wi-Fi apparatus 307 is configured to provide, for the mobile phone 300, network access that complies with a Wi-Fi-related standard protocol. The mobile phone 300 may access a Wi-Fi access point via the Wi-Fi apparatus 307, to help the user to receive and send an email, browse a web page, access streaming media, and the like. The Wi-Fi apparatus 307 provides wireless broadband internet access for the user. In some other embodiments, the Wi-Fi apparatus 307 may also be used as a Wi-Fi wireless access point, and may provide Wi-Fi network access for another device.

The positioning apparatus 308 is configured to provide a geographical location for the mobile phone 300. It may be understood that the positioning apparatus 308 may be specifically a receiver of a positioning system such as a global positioning system (GPS), a BeiDou navigation satellite system, or a Russian GLONASS. After receiving a geographic location sent by the positioning system, the positioning apparatus 308 sends the information to the processor 301 for processing, or sends the information to the memory 303 for storage. In some other embodiments, the positioning apparatus 308 may alternatively be a receiver of an assisted global positioning system (AGPS). The AGPS system serves as an assisted server to assist the positioning apparatus 308 in completing ranging and positioning services. In this case, the assisted positioning server communicates with a device such as the positioning apparatus 308 (namely, a GPS receiver) of the mobile phone 300 through a wireless communications network, to provide positioning assistance. In some other embodiments, the positioning apparatus 308 may alternatively be a positioning technology based on a Wi-Fi access point. Each Wi-Fi access point has a globally unique MAC address, and the device may scan and collect a broadcast signal of a surrounding Wi-Fi access point when Wi-Fi is enabled. Therefore, the device may obtain a MAC address broadcast through the Wi-Fi access point. The device sends such data (for example, the MAC address) that can identify the Wi-Fi access point to a location server through the wireless communications network. The location server retrieves a geographical location of each Wi-Fi access point, calculates a geographical location of the device with reference to the strength of the Wi-Fi broadcast signal, and sends the geographical location of the device to the positioning apparatus 308 of the device.

The audio circuit 309, a loudspeaker 313, and a microphone 314 may provide an audio interface between the user and the mobile phone 300. The audio circuit 309 may convert received audio data into an electrical signal and then transmit the electrical signal to the speaker 313, and the speaker 313 converts the electrical signal into a sound signal for output. In addition, the microphone 314 converts a collected sound signal into an electrical signal. The audio circuit 309 receives the electrical signal, converts the electrical signal into audio data, and then outputs the audio data to the RF circuit 302, to send the audio data to, for example, another mobile phone, or outputs the audio data to the memory 303 for further processing.

The peripheral interface 310 is configured to provide various interfaces for an external input/output device (for example, a keyboard, a mouse, an external display, an external memory, or a subscriber identification module card). For example, the peripheral interface 310 is connected to the mouse by using a universal serial bus (USB) interface, and is connected, by using a metal contact on a card slot of the subscriber identification module card, to a subscriber identification module (SIM) card provided by a telecommunications operator. The peripheral interface 310 may be configured to couple the external input/output peripheral device to the processor 301 and the memory 303.

In this embodiment of this application, the mobile phone 300 may communicate with another device in a device group through the peripheral interface 310, for example, may receive, through the peripheral interface 310, display data sent by another device, and display the display data. This is not limited in this embodiment of this application.

The mobile phone 300 may further include the power apparatus 311 (for example, a battery and a power management chip) that supplies power to the components. The battery may be logically connected to the processor 301 via the power management chip, so that the power apparatus 311 implements functions such as charging and discharging management and power consumption management.

Although not shown in FIG. 3, the mobile phone 300 may further include a camera (a front-facing camera and/or a rear-facing camera), a flash, a micro projection apparatus, a near field communication (NFC) apparatus, and the like. Details are not described herein.

The radio access device in the embodiments of this application may be a radio access point (AP), or may be a base station. This is not specifically limited in the embodiments of this application.

Figure 4:
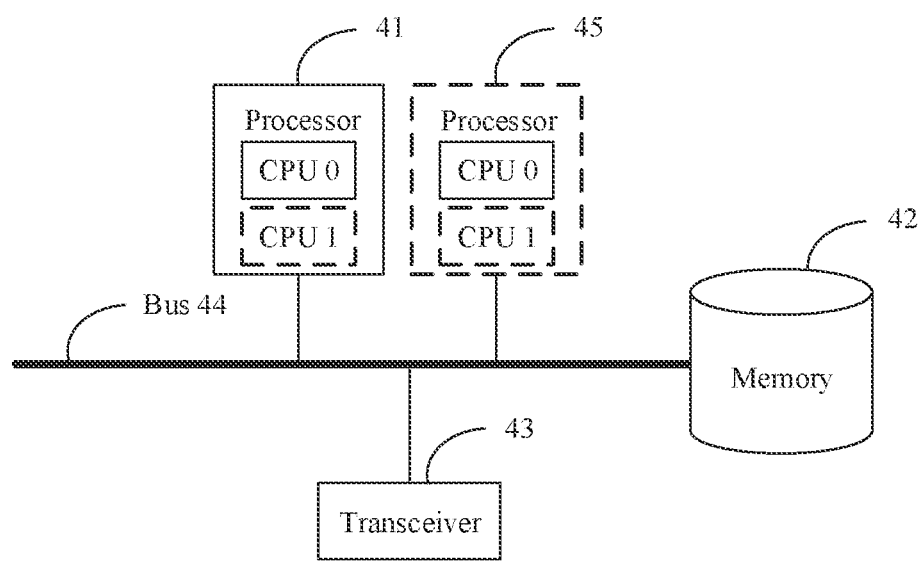
FIG. 4 is a schematic diagram of a hardware structure of a mobile phone according to an embodiment of this application.

FIG. 4 is a schematic composition diagram of a radio access network device according to an embodiment of this application. As shown in FIG. 4, the radio access network device may include at least one processor 41, a memory 42, a transceiver 43, and a bus 44.

The following specifically describes each constituent component of the radio access network device with reference to FIG. 4.

The processor 41 is a control center of the radio access network device, and may be one processor, or may be a collective term for a plurality of processing elements. For example, the processor 41 may be a CPU, or an application-specific integrated circuit (ASIC), or may be configured as one or more integrated circuits implementing this embodiment of this application, for example, one or more microprocessors (DSP) or one or more field programmable gate arrays (FPGA).

The processor 41 may perform various functions of the radio access network device by running or executing a software program stored in the memory 42 and invoking data stored in the memory 42.

During specific implementation, in an embodiment, the processor 41 may include one or more CPUs, for example, a CPU 0 and a CPU 1 shown in the figure.

During specific implementation, in an embodiment, the radio access network device may include a plurality of processors, for example, the processor 41 and a processor 45 that are shown in FIG. 4. Each of the processors may be a single-core processor (single-CPU) or may be a multi-core processor (multi-CPU). The processor herein may refer to one or more devices, circuits, and/or processing cores configured to process data (for example, computer program instructions).

The memory 42 may be a read-only memory (ROM) or another type of static storage device that can store static information and an instruction, or a random access memory (RAM) or another type of dynamic storage device that can store information and an instruction. The memory 42 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 42 is not limited thereto. The memory 42 may exist independently and is connected to the processor 41 through the communications bus 44. The memory 42 may alternatively be integrated with the processor 41.

The memory 42 is configured to store a software program that performs the solutions of this application, and the processor 41 controls the execution of the software program.

The transceiver 43 is configured to communicate with another device or a communications network, for example, configured to communicate with a communications network such as an Ethernet, a radio access network (RAN), or a wireless local area network (WLAN). The transceiver 43 may include all or a part of a baseband processor, and may further optionally include an RF processor. The RF processor is configured to send and receive an RF signal. The baseband processor is configured to process a baseband signal converted from the RF signal or a baseband signal to be converted into the RF signal.

The bus 44 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 4, but this does not mean that there is only one bus or only one type of bus.

The structure of the device shown in FIG. 4 does not constitute a limitation on the radio access network device. The device may include more or fewer components than those shown in the figure, or some components may be combined, or the device may have different component arrangements.

The connection reestablishment method provided in this application is described with reference to the communications system shown in FIG. 2, the hardware structure of the mobile phone shown in FIG. 3, and the structure of the radio access network device shown in FIG. 4.

For ease of description, the following uses an example in which the radio access network device is a base station for description.

Figure 5A:
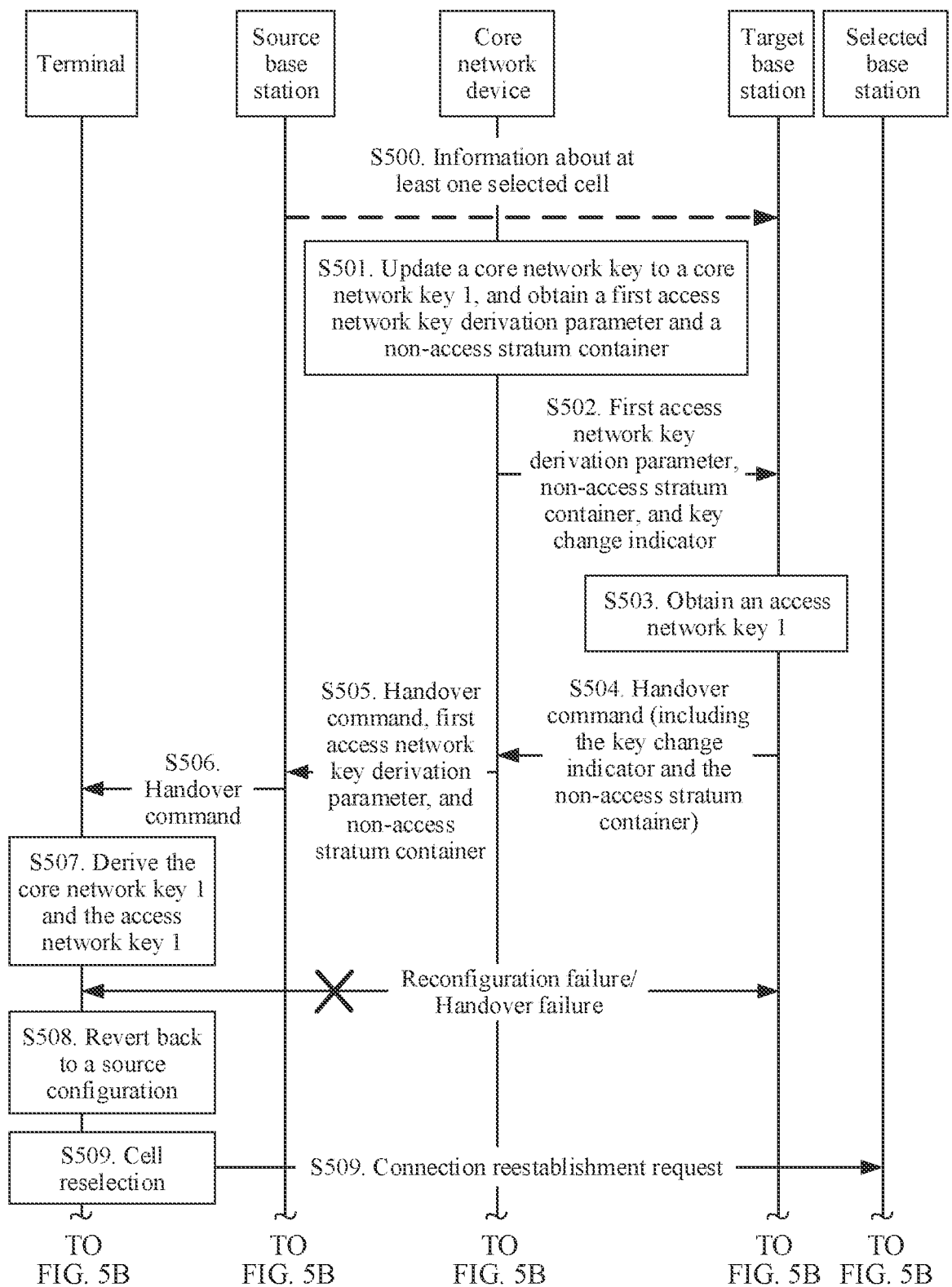
FIG. 5A and FIG. 5B are a schematic flowchart 1 of a connection reestablishment method according to an embodiment of this application.
Figure 5B:
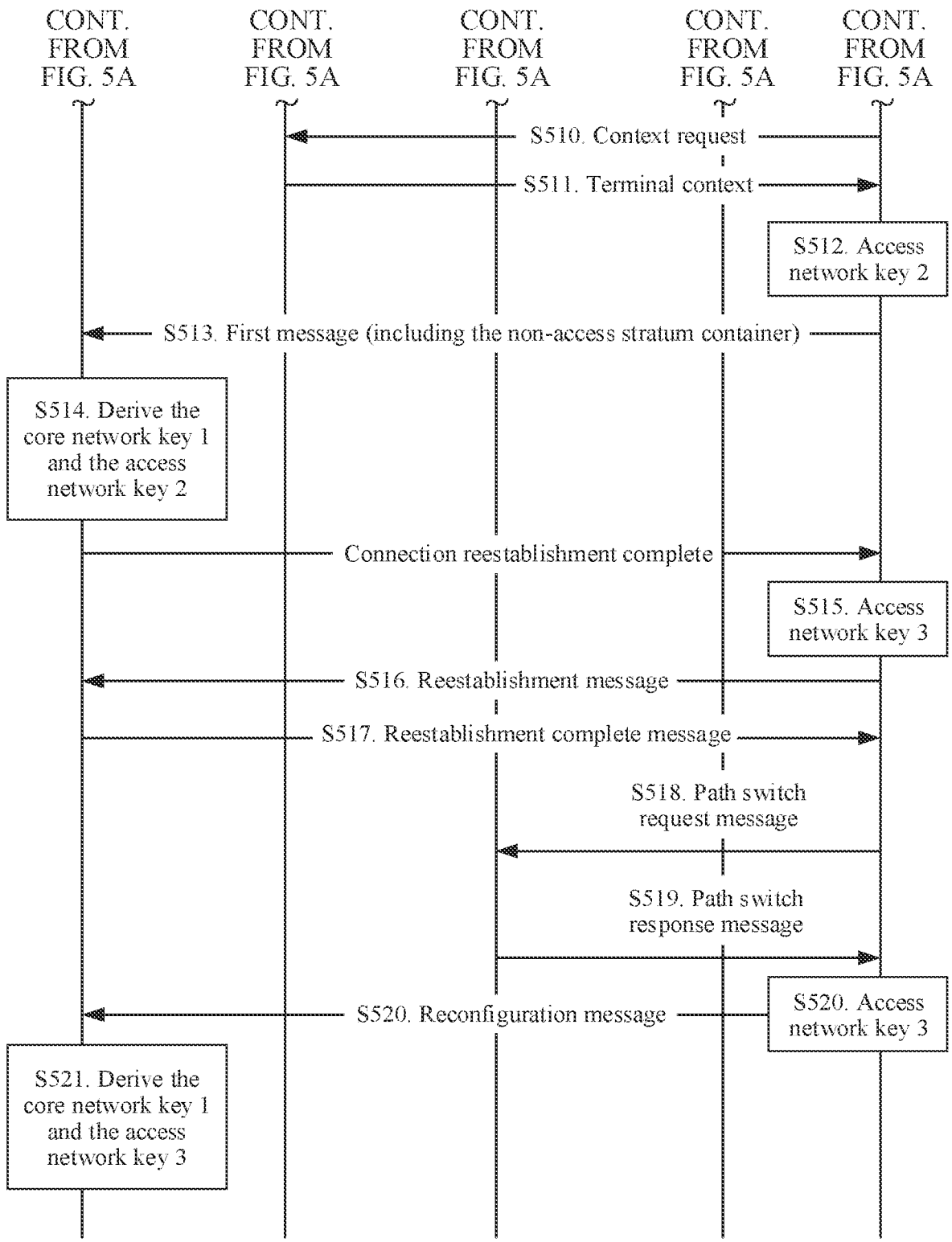

FIG. 5A and FIG. 5B are a schematic flowchart of a connection reestablishment method according to an embodiment of this application. Referring to FIG. 5A and FIG. 5B, the connection reestablishment method includes the following steps.

S500. A source base station determines to hand over, based on an interface between a base station and a core network device, a terminal from a source cell to a target cell that is served by a target base station.

Optionally, the source base station sends information (for example, security parameter information VarShortMAC-Input) about at least one selected cell to the target base station through the interface (for example, an NG interface) between the base station and the core network device. The information about the at least one selected cell is determined by the source base station based on a source access network key, a PCI of the source cell, a C-RNTI of the source cell, and related information (such as an identifier of the target cell and a frequency of the target cell) of the target base station. The information about the at least one selected cell is used by the target base station to perform a security check on the terminal based on the information about the at least one selected cell after the terminal sends a connection reestablishment request to the target base station.

In FIG. 5A and FIG. 5B, a dashed line is used to indicate that a step in which the source base station sends the information about the at least one selected cell to the target base station through the interface between the base station and the core network device is optional.

S501. The core network device updates a source core network key to a core network key 1, and obtains a first access network key derivation parameter and a non-access stratum container (NAS container) based on the core network key 1.

The first access network key derivation parameter includes at least one of an access network key 1, a first derivation parameter (for example, an NCC), and a second derivation parameter (for example, an NH).

Optionally, both the access network key 1 and the second derivation parameter are determined by the core network device through derivation based on the core network key 1.

The core network key 1 in this embodiment corresponds to a first core network key.

The core network device herein is a collective name of a source core network device and a target core network device. In the embodiments of this application, the source core network device and the target core network device may be a same device, or may be different devices. This is not specifically limited in the embodiments of this application.

For ease of understanding, an example in which the source core network device and the target core network device are different devices is used for description in this embodiment of this application.

In a first possible implementation, the source core network device obtains the core network key 1 based on the source core network key, and sends the core network key 1 to the target core network device. In this way, based on the core network key 1, the target core network device derives the first access network key derivation parameter and generates the NAS container.

It should be noted that, in this possible implementation, the source core network device may update the source core network key to the core network key 1, or may keep the source core network key unchanged before receiving a message used to indicate that the terminal is successfully handed over, that is, before the message used to indicate that the terminal is successfully handed over is received, a valid core network key in the source core network device is still the source core network key.

If the source core network device keeps the source core network key unchanged before receiving the message used to indicate that the terminal is successfully handed over, the source core network still uses the source core network key when the source base station cancels the handover procedure or the terminal subsequently initiates reestablishment for the source base station.

In a second possible implementation, the source core network device updates the source core network key to the core network key 1, and obtains the first access network key derivation parameter and the NAS container based on the core network key 1.

In a third possible implementation, the target core network device updates the source core network key to the core network key 1, and obtains the first access network key derivation parameter and the NAS container based on the core network key 1.

S502. The core network device sends the first access network key derivation parameter, the NAS container, and a key change indicator to the target base station.

The key change indicator is used to indicate re-keying of the access network key.

Specifically, the target core network device sends the first access network key derivation parameter, the NAS container, and the key change indicator to the target base station.

In the foregoing second possible implementation, after obtaining the first access network key derivation parameter and the NAS container, the source core network device sends the first access network key derivation parameter, the NAS container, and the key change indicator to the target core network device.

S503. The target base station obtains the access network key 1.

Optionally, the target base station obtains the access network key 1 based on the first access network key derivation parameter sent by the core network device.

In an optional implementation, if the first access network key derivation parameter includes the first derivation parameter and the second derivation parameter, the target base station obtains the access network key 1 based on the first derivation parameter and the second derivation parameter.

S504. The target base station sends a handover command, including the key change indicator and the NAS container, to the core network device.

The handover command may be an RRC message.

Optionally, the key change indicator in S502 and the key change indicator in S504 may be same indication information, or may be different indication information.

It should be noted that, even if the key change indicator in S502 and the key change indicator in S504 are different indication information, there is an association relationship between the key change indicator in S502 and the key change indicator in S504. For example, the target base station deduces, based on the key change indicator in S502, that the key change indicator needs to be carried in the handover command in S504.

S505. The core network device sends the handover command, the first access network key derivation parameter, and the NAS container to the source base station.

If the handover command is an RRC message, the core network device transparently transmits the RRC message to the source base station.

Optionally, the core network device may send a message including the handover command, the first access network key derivation parameter, and the NAS container to the source base station, or may send the handover command to the source base station and send a message including the first access network key derivation parameter and the NAS container to the source base station. This is not specifically limited in this embodiment of this application.

Optionally, the core network device sends the handover command to the source base station in the handover procedure, and sends the first access network key derivation parameter and the NAS container to the source base station after determining that the terminal fails to be handed over.

In the foregoing first possible implementation and the third possible implementation, the target core network device sends the handover command, the first access network key derivation parameter, and the NAS container to the source base station via the source core network device.

In the foregoing second possible implementation, after receiving the handover command sent by the target base station, the target core network device sends the handover command to the source base station via the source core network device. In addition, the source core network device further sends the first access network key derivation parameter and the NAS container to the source base station.

S506. The source base station sends the handover command to the terminal.

Optionally, after receiving the first access network key derivation parameter, the source base station may further obtain a new access network key (for example, an access network key 2) based on the first access network key derivation parameter.

S507. The terminal performs a related configuration based on the handover command.

In a possible case, if the terminal cannot successfully apply configuration information in the handover command, the terminal determines that a reconfiguration failure occurs.

In another possible case, the terminal successfully applies configuration information in the handover command. Specifically, the terminal starts a first timer, derives the core network key 1 based on the NAS container in the handover command, and derives the access network key 1 based on the key change indicator and the core network key 1.

Specifically, after receiving the handover command, a NAS of the terminal derives the core network key 1 based on the NAS container, and an AS derives the access network key 1 based on the key change indicator and the core network key 1.

Duration of the first timer is a longest time that the terminal waits in a handover procedure. If the terminal has not completed the handover when the first timer expires, the terminal determines that the handover fails.

S508. If the terminal fails in a reconfiguration or a handover, the terminal reverts back to a source configuration.

In this embodiment of this application, a configuration used by the terminal in the source cell is referred to as the source configuration for short.

Optionally, the source configuration includes a state variable and a parameter of each radio bearer (RB). The source configuration does not include configurations of a physical (PHY) layer and a media access control (MAC) layer in the source cell. Subsequently, the terminal needs to determine a selected cell based on cell signal quality. The selected cell may be a source cell, or may be a target cell, or may even be another cell different from the source cell and the target cell. After camping on a cell, the terminal needs to use configurations of a physical layer and a media access control layer in the cell.

In this embodiment, that the terminal reverts back to a source configuration includes that an access network key of the terminal is reverted back to a source access network key from the access network key 1, and a core network key of the terminal is reverted back to the source core network key from the core network key 1. Herein, the source access network key may be an access network key directly derived by the terminal based on the source core network key, or may be an access network key further derived by the terminal based on an NCC, an NH, and "an access network key directly derived by the terminal based on the source core network key" during the handover.

Optionally, if the terminal fails in the reconfiguration or the handover, the access stratum (AS) of the terminal reverts the access network key back to the source access network key. The AS of the terminal sends an indication message to the NAS of the terminal, where the indication message is used to indicate that the reconfiguration failure/handover failure occurs in the handover procedure; or the indication message is used to directly indicate to revert the core network key back to the source core network key, and correspondingly, the NAS of the terminal reverts the core network key 1 back to the source core network key. In this case, the source core network key is a core network key used before the NAS receives the NAS container.

S509. After the terminal reverts back to the source configuration, the terminal performs cell selection, and sends a connection reestablishment request to a selected base station.

The selected base station provides a service for a suitable cell selected by the terminal. Herein, the suitable cell is a cell determined by the terminal by performing cell selection. In the following, the suitable cell selected by the terminal is collectively referred to as a selected cell.

Optionally, the selected base station may be a source base station, or may be a target base station, or may be another station different from the source base station and the target base station. This is not specifically limited in this embodiment of this application.

After the terminal determines the selected cell, the terminal sends the connection reestablishment request to the selected base station, where the connection reestablishment request includes first security check information. The first security check information is obtained by the terminal based on the source access network key.

The connection reestablishment request may be an RRC connection reestablishment request or an RRC reestablishment request message.

When the selected base station is another station different from the source base station and the target base station, the connection reestablishment method provided in this embodiment of this application further includes S510 to S521 after S509.

When the selected base station is the target base station, or when the selected base station is the source base station, and the source base station obtains the first access network key derivation parameter and the NAS container in S505, the connection reestablishment method provided in this embodiment of this application further includes S512 to S514 after S509.

When the selected base station is the source base station, and the source base station does not obtain the first access network key derivation parameter and the NAS container in S505, the connection reestablishment method provided in this embodiment of this application further includes S515 to S517 after S509.

S510. The selected base station sends a context request to the source base station.

S511. The source base station sends a terminal context to the selected base station.

Optionally, if the source base station obtains the first access network key derivation parameter and the NAS container in S505, the terminal context includes at least one of the following information: an identifier (for example, an AMF UE NGAP ID) allocated by a source core network to the terminal, the first access network key derivation parameter, the NAS container, and second security check information. Herein, the second security check information is obtained by the source base station based on the source access network key. In this case, the connection reestablishment method provided in this embodiment of this application further includes S512 to S514 after S511.

Optionally, if the source base station does not obtain the first access network key derivation parameter and the NAS container in S505, the terminal context includes at least one of the following information: an identifier (for example, an AMF UE NGAP ID) allocated by a source core network to the terminal, second security check information, and a source access network key derivation parameter. Herein, the second security check information is obtained by the source base station based on the source access network key. The source access network key derivation parameter includes at least one of the following information: a first derivation parameter (referred to as a source first derivation parameter for short) of the terminal that is stored before the source base station initiates the handover procedure, a second derivation parameter (referred to as a source second derivation parameter) of the terminal that is stored before the source base station initiates the handover procedure, and an access network key 3 derived by the source base station based on the first derivation parameter, the second derivation parameter, and information about the selected base station (for example, a frequency and cell identifier information of the selected cell). In this case, the connection reestablishment method provided in this embodiment of this application further includes S515 to S521 after S511.

S512. The selected base station obtains the access network key 2 based on the first access network key derivation parameter.

Optionally, the selected base station performs a security check on the connection reestablishment request. After the security check succeeds, the selected base station obtains the access network key 2 based on the first access network key derivation parameter.

Optionally, the selected base station may check the connection reestablishment request based on the first security check information and the second security check information, or the selected base station may send the first security check information to the source base station, the source base station performs a security check, and the source base station sends a security check result to the selected base station.

S513. The selected base station sends a first message, including the NAS container, to the terminal.

The NAS container implicitly indicates to derive an access network key based on a core network key.

Optionally, the first message further includes at least one of the first derivation parameter (for example, an NCC) and the key change indicator. The first derivation parameter or the key change indicator may also be used to indicate to derive an access network key based on a core network key.

For example, when a value of the first derivation parameter is a special value (for example, NCC=0), the first derivation parameter is used to indicate to derive the access network key based on the core network key.

S514. The terminal sends the NAS container to the NAS, derives the core network key 1, and derives the access network key 2 based on the core network key 1, thereby implementing communication with the selected base station.

S515. The selected base station obtains the access network key 3 based on the source access network key derivation parameter.

Optionally, the selected base station performs a security check on the connection reestablishment request. After the security check succeeds, the selected base station obtains the access network key 3 based on the source access network key derivation parameter.

Optionally, the selected base station may check the connection reestablishment request based on the first security check information and the second security check information, or the selected base station may send the first security check information to the source base station, the source base station performs a security check, and the source base station sends a security check result to the selected base station.

S516. The selected base station sends a reestablishment message to the terminal, where the reestablishment message is used to indicate the terminal to reestablish an RRC connection.

Optionally, the reestablishment message further includes the source first derivation parameter (for example, an NCC).

S517. The terminal sends a reestablishment complete message to the selected base station.

Optionally, the terminal derives the access network key 3 based on the source first derivation parameter, and obtains, based on the access network key 3, an AS key used for RRC message security protection. Subsequently, the terminal performs security protection on the reestablishment complete message by using the AS key, and sends, to the selected base station, the reestablishment complete message on which security protection is performed, thereby implementing communication with the selected base station.

S518. The selected base station sends a path switch request message to the core network device, to notify the core network device that the terminal is connected to the selected base station and subsequently performs data transmission via the selected base station.

Optionally, the path switch request message carries the identifier (for example, an AMF UE NGAP ID) allocated by the source core network to the terminal.

S519. The core network device switches a data transmission path of the terminal to the selected base station, and sends a path switch response message to the selected base station.

Optionally, the core network device determines whether to update the core network key. If the core network key is updated, the core network device includes at least one of the following information in the path switch response message: a third access network key derivation parameter, a NAS container, and a fourth key change indicator.

In a scenario in which the core network device determines to update the core network key, S520 and S521 are performed after S519.

S520. The selected base station obtains the access network key 3 based on the third access network key derivation parameter, derives, based on the access network key 3, the AS key used for security protection during communication with the terminal, and sends a reconfiguration message to the terminal.

The reconfiguration message includes the NAS container and the key change indicator.

S521. The terminal sends the NAS container to the NAS, so that the NAS derives a core network key 3, and derives the access network key 3 based on the core network key 3.

Further, the terminal derives, based on the access network key 3, the AS key used for security protection during communication with the selected base station.

In this embodiment of this application, the access network key 1 and the access network key 3 may be the same or may be different. This is not specifically limited in this embodiment of this application.

It is easy to understand that, if the selected base station is the source base station, because the source base station obtains the first access network key derivation parameter from the core network device, the source base station can obtain a new access network key (for example, the access network key 3). In this case, the access network keys or the core network keys of the terminal, the selected base station, and the core network device are the same.

If the selected base station is the target base station, because the target base station obtains the first access network key derivation parameter from the core network device, the target base station can obtain a new access network key (for example, the access network key 3). In this case, the access network keys or the core network keys of the terminal, the selected base station, and the core network device are the same.

If the selected base station is another base station different from the source base station and the target base station, the selected base station may obtain the terminal context through an interface (for example, an Xn interface) between the selected base station and the source base station, and further obtain a new access network key (for example, the access network key 3). In this way, the access network keys or the core network keys of the terminal, the selected base station, and the core network device are the same.

It can be learned that according to the connection reestablishment method provided in this embodiment of this application, the access network keys or the core network keys of the terminal, the selected base station, and the core network device can be the same. In this way, even in a scenario in which the core network device updates the core network key in the handover procedure of the terminal, and the terminal fails to be handed over, the connection reestablishment of the terminal may also be completed.

In this application, when the handover fails, that the terminal reverts back to the source configuration may be that the access network key of the terminal is reverted back to the source access network key from the access network key 1, and the core network key of the terminal is reverted back to the source core network key from the core network key 1; or may be that the access network key of the terminal is reverted back to the source access network key from the access network key 1, and the core network key of the terminal remains as the core network key 1.

Herein, it is described by using an example in which that the terminal reverts back to the source configuration means that the access network key of the terminal is reverted back to the source access network key from the access network key 1, and the core network key of the terminal remains as the core network key 1.

Figure 6A:
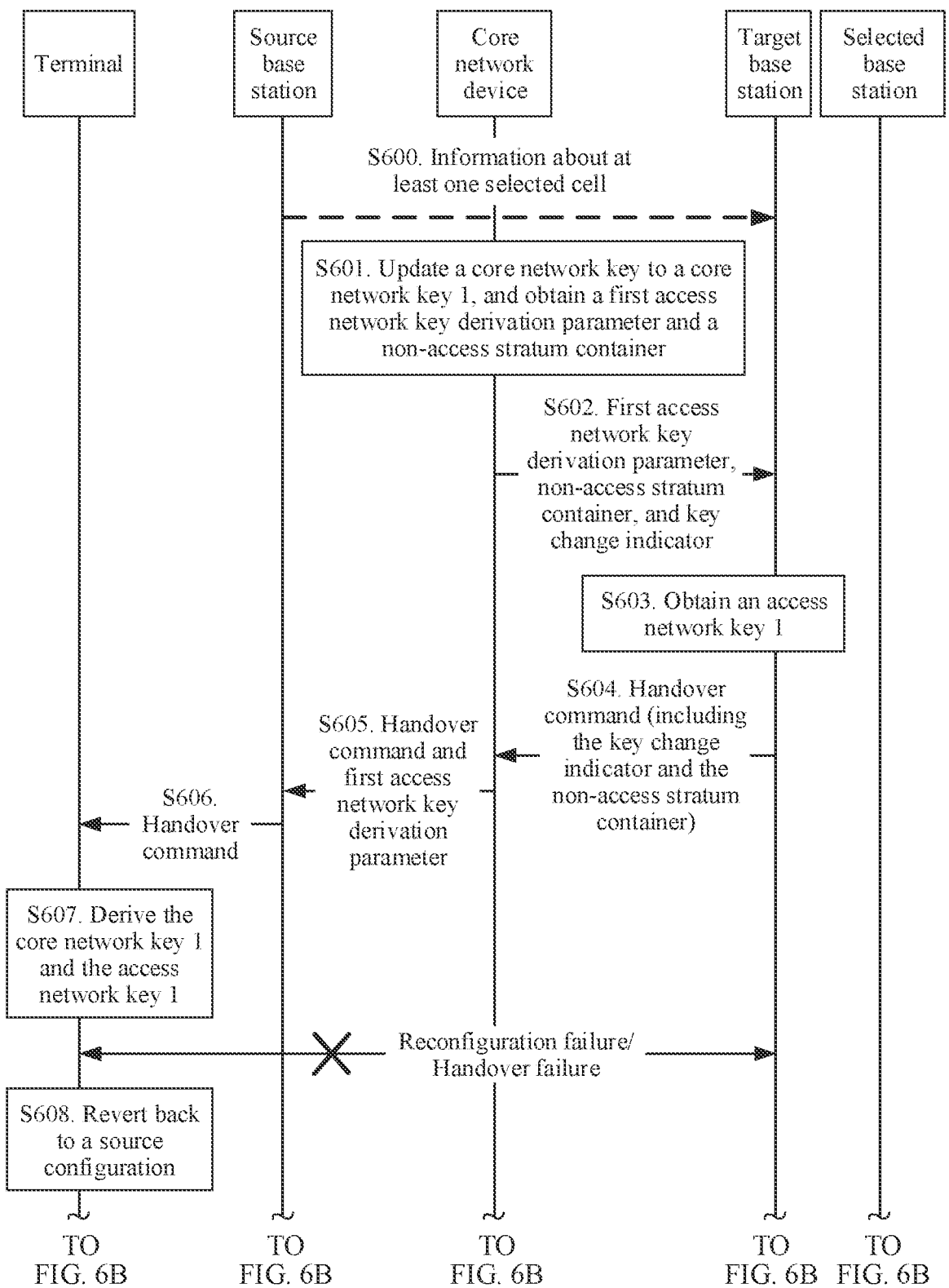
FIG. 6A and FIG. 6B are a schematic flowchart 2 of a connection reestablishment method according to an embodiment of this application.
Figure 6B:
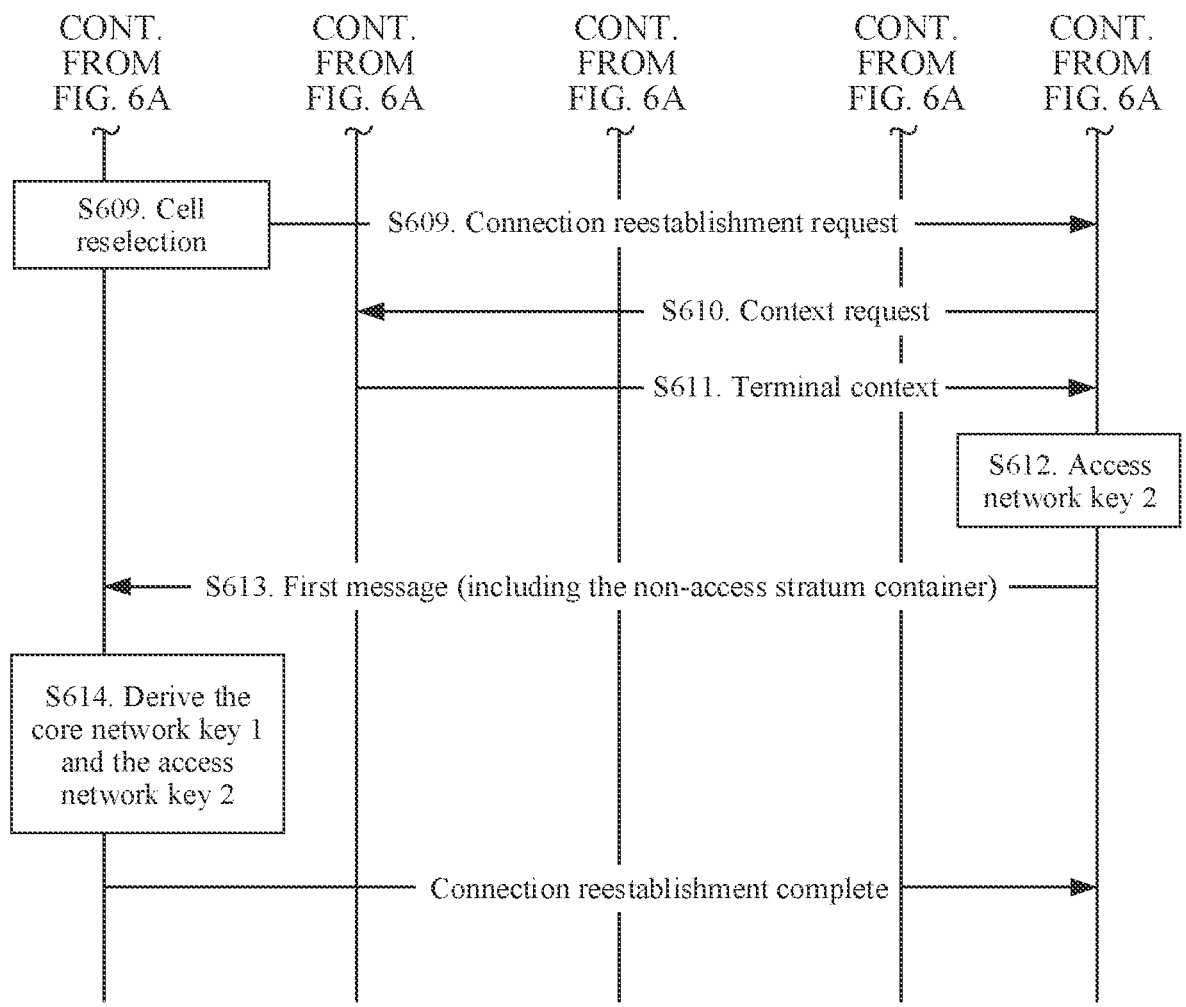

FIG. 6A and FIG. 6B are a schematic flowchart of another connection reestablishment method according to an embodiment of this application. Referring to FIG. 6A and FIG. 6B, the connection reestablishment method includes the following steps.

S600. A source base station determines to hand over, based on an interface between the base station and a core network device, a terminal from a source cell to a target cell that is served by a target base station.

For S600, refer to the foregoing description of S500. Details are not described herein again.

S601. The core network device updates a source core network key to a core network key 1, and obtains a first access network key derivation parameter and a NAS container based on the core network key 1.

For S601, refer to the foregoing description of S501. Details are not described herein again.

S602. The core network device sends the first access network key derivation parameter, the NAS container, and a key change indicator to the target base station.

For S602, refer to the foregoing description of S502. Details are not described herein again.

S603. The target base station obtains an access network key 1.

S604. The target base station sends a handover command, including the key change indicator and the NAS container, to the core network device.

The handover command may be an RRC message.

S605. The core network device sends the handover command and the first access network key derivation parameter to the source base station.

In the foregoing first possible implementation and the third possible implementation, a target core network device sends the handover command and the first access network key derivation parameter to the source base station via a source core network device.

In the foregoing second possible implementation, after receiving the handover command sent by the target base station, the target core network device sends the handover command to the source base station via the source core network device. In addition, the source core network device further sends the first access network key derivation parameter to the source base station.

S606. The source base station sends the handover command to the terminal.

Optionally, after receiving the first access network key derivation parameter, the source base station may further obtain a new access network key (for example, an access network key 2) based on the first access network key derivation parameter.

S607. The terminal starts a first timer, derives the core network key 1 based on the NAS container in the handover command, and derives the access network key 1 based on the key change indicator and the core network key 1.

For S607, refer to the foregoing description of S507. Details are not described herein again.

S608. If the terminal fails in a reconfiguration/handover, the terminal reverts back to a source configuration.

For a definition of the source configuration, refer to the foregoing description of S508. Details are not described herein again.

In this embodiment, that the terminal reverts back to the source configuration means that an access network key of the terminal is reverted back to a source access network key from the access network key 1, and a core network key of the terminal remains as the core network key 1.

Optionally, if the handover of the terminal fails, an access AS of the terminal reverts the access network key back to the source access network key.

S609. After the terminal reverts back to the source configuration, the terminal performs cell selection, and sends a connection reestablishment request to a selected base station.

For S609, refer to the foregoing description of S509. Details are not described herein again.

S610. The selected base station sends a context request to the source base station.

S611. The source base station sends a terminal context to the selected base station.

The terminal context includes the first access network key derivation parameter and second security check information.

S612. The selected base station obtains the access network key 2 based on the first access network key derivation parameter.

For S612, refer to the foregoing description of S512. Details are not described herein again.

S613. The selected base station sends a first message including indication information to the terminal.

The indication information is used to indicate to derive an access network key based on a core network key.

Specifically, the indication information includes at least one of a first derivation parameter (for example, an NCC) and a key change indicator.

For example, when a value of the first derivation parameter is a special value (for example, NCC=0), the first derivation parameter is used to indicate to derive the access network key based on the core network key.

S614. The terminal derives the access network key 2 based on the indication information and the core network key 1, thereby implement communication with the selected base station.

In this embodiment of this application, the access network key 1 and the access network key 2 may be the same or may be different. This is not specifically limited in this embodiment of this application.

It is easy to understand that, if the selected base station is the source base station, because the source base station obtains the first access network key derivation parameter from the core network device, the source base station can obtain a new access network key (for example, the access network key 2). In this case, the access network keys or the core network keys of the terminal, the selected base station, and the core network device are the same, and the connection reestablishment can be completed.

If the selected base station is the target base station, because the target base station obtains the first access network key derivation parameter from the core network device, the target base station can obtain a new access network key (for example, the access network key 2). In this case, the access network keys or the core network keys of the terminal, the selected base station, and the core network device are the same.

If the selected base station is another base station different from the source base station and the target base station, the selected base station may obtain the terminal context through an interface (for example, an Xn interface) between the selected base station and the source base station, and further obtain a new access network key (for example, the access network key 2). In this way, the access network keys or the core network keys of the terminal, the selected base station, and the core network device are the same.

It can be learned that according to the connection reestablishment method provided in this embodiment of this application, the access network keys or the core network keys of the terminal, the selected base station, and the core network device can be the same. In this way, even in a scenario in which the core network device updates the core network key in the handover procedure of the terminal, and the terminal fails to be handed over, the connection reestablishment of the terminal may also be completed.

In addition, the connection reestablishment method provided in this application may alternatively be as follows: In a connection reestablishment procedure, the terminal first establishes a connection to the selected base station, and subsequently implements consistency of the keys of the selected base station and the core network device, thereby implementing consistency of the keys of the terminal, the selected base station, and the core network device.

Figure 7A:
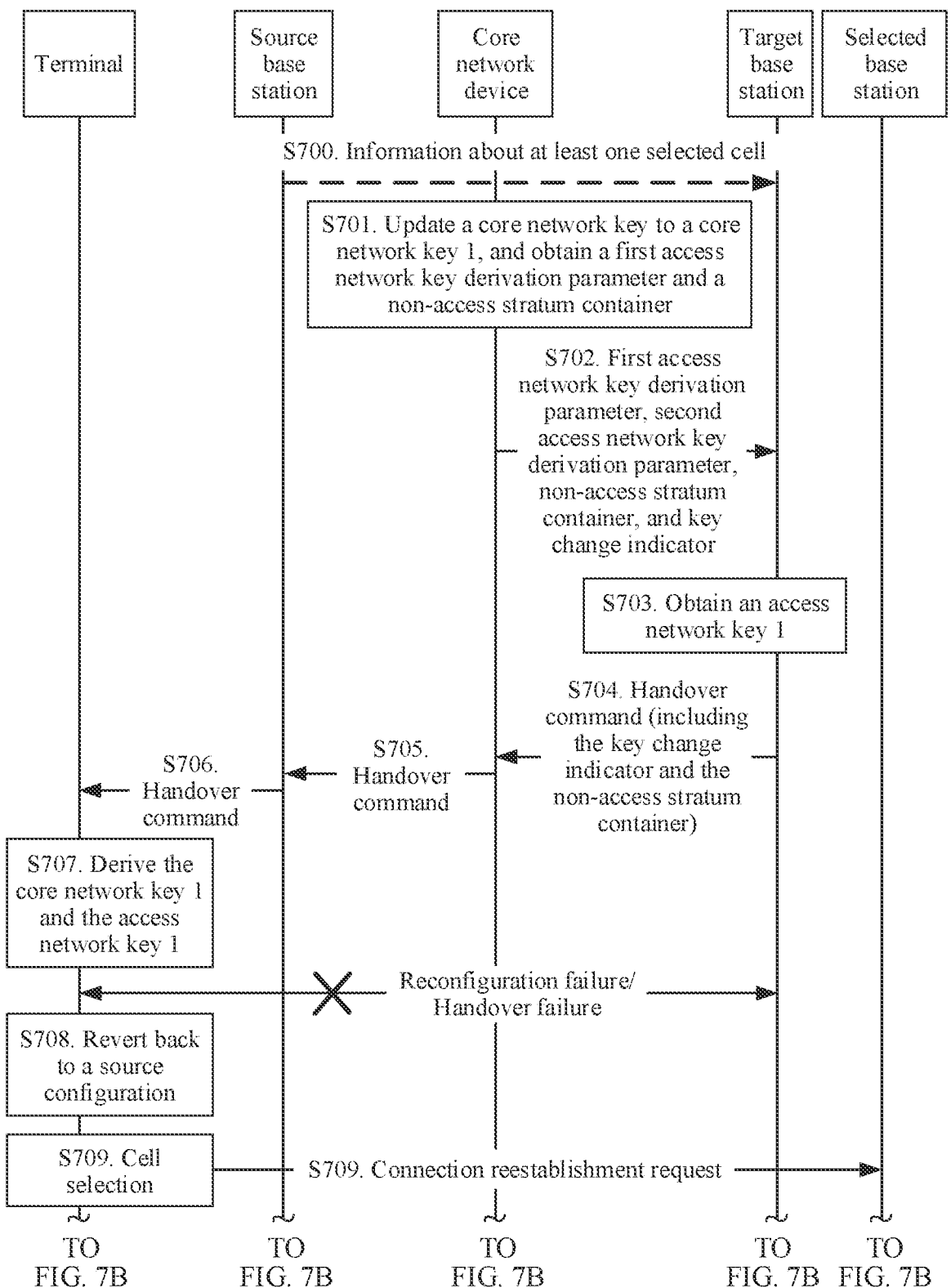
FIG. 7A, FIG. 7B, and FIG. 7C are a schematic flowchart 3 of a connection reestablishment method according to an embodiment of this application.
Figure 7B:
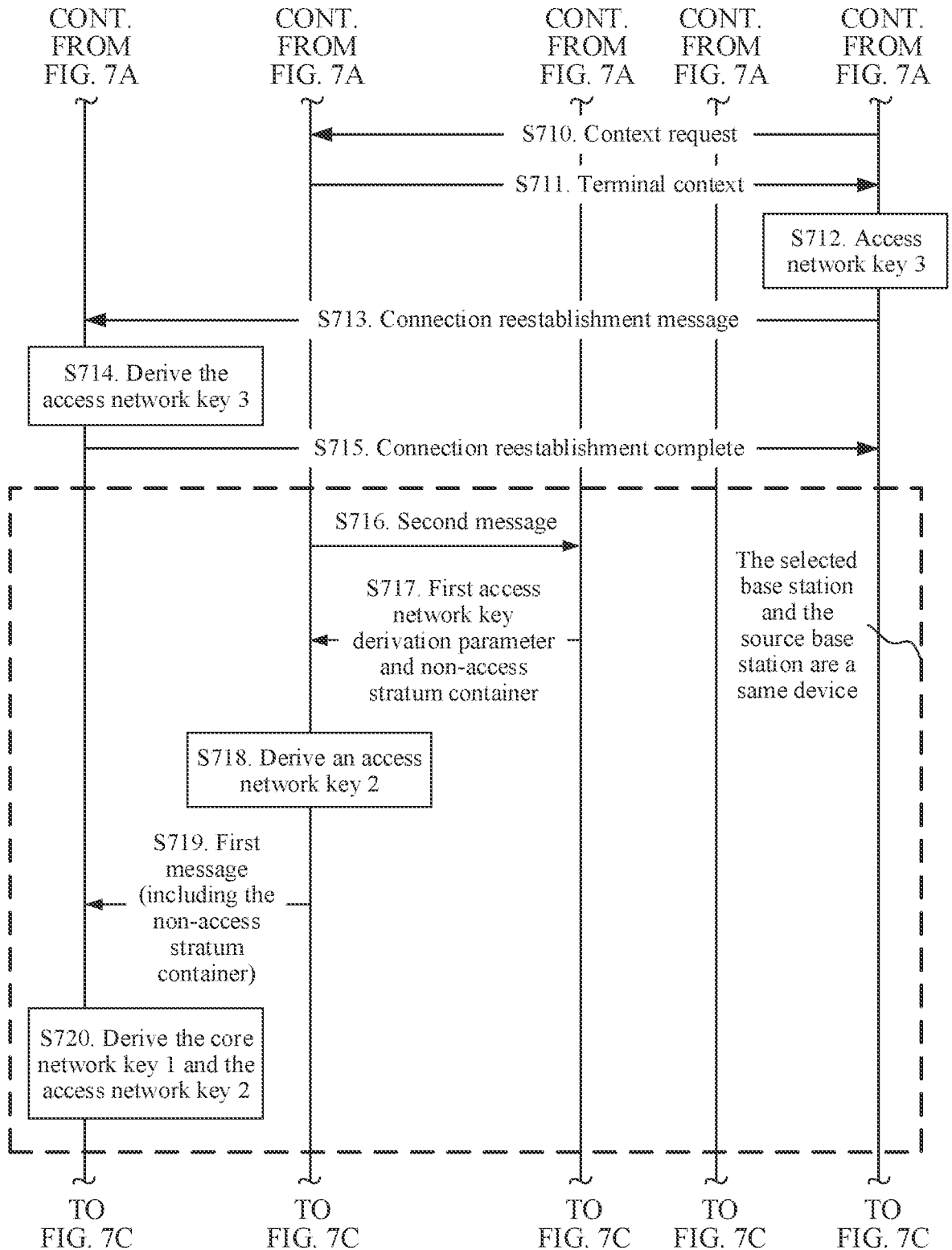
Figure 7C:
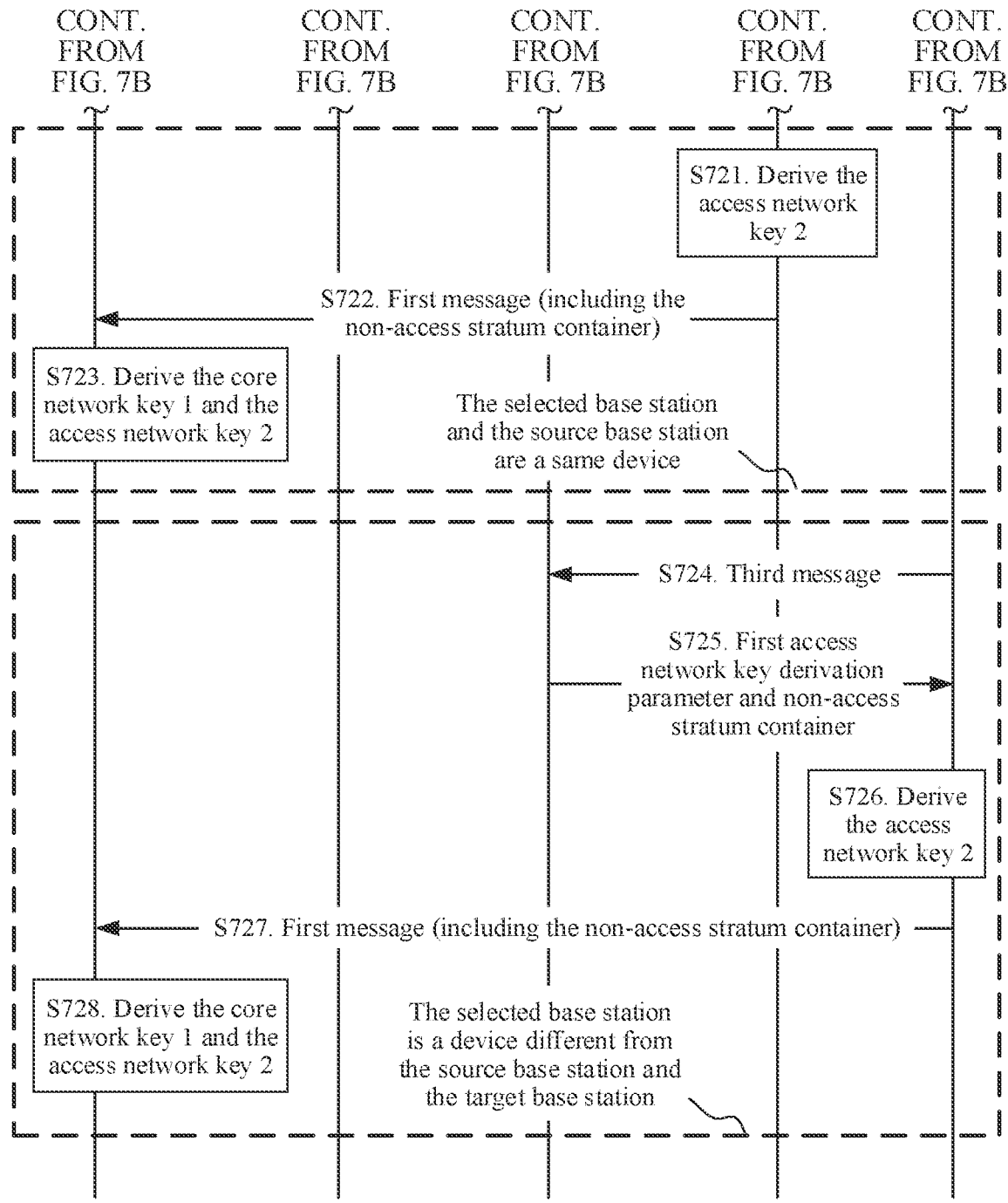

Specifically, FIG. 7A, FIG. 7B, and FIG. 7C show a procedure of the connection reestablishment method. Referring to FIG. 7A, FIG. 7B, and FIG. 7C, the connection reestablishment method includes the following steps.

S700. A source base station determines to hand over, based on an interface between the base station and a core network device, a terminal from a source cell to a target cell that is served by a target base station.

Optionally, the source base station sends information (for example, security parameter information VarShortMAC-Input) about at least one selected cell to the target base station through the interface (for example, an NG interface) between the base station and the core network device. The information about the at least one selected cell is determined by the source base station based on a source access network key, a PCI of the source cell, a C-RNTI of the source cell, and related information (such as an identifier of the target cell and a frequency of the target cell) of the target base station. The information about the at least one selected cell is used by the target base station to perform a security check on the terminal based on the information about the at least one selected cell after the terminal sends a connection reestablishment request to the target base station.

Optionally, in a handover procedure, the source base station obtains a second access network key derivation parameter, and sends the second access network key derivation parameter to the target base station through the interface (for example, the NG interface) between the base station and the core network device. The second access network key derivation parameter may include at least one of the following parameters: a target access network key, an NCC, and an NH.

S701. The core network device updates a source core network key to a core network key 1, and obtains a first access network key derivation parameter and a NAS container based on the core network key 1.

For S701, refer to the foregoing description of S501. Details are not described herein again.

S702. The core network device sends the first access network key derivation parameter, the second access network key derivation parameter, the NAS container, and a key change indicator to the target base station.

The key change indicator is used to indicate to derive an access network key based on a core network key.

Specifically, a target core network device sends the first access network key derivation parameter, the second access network key derivation parameter, the NAS container, and the key change indicator to the target base station.

S703. The target base station obtains an access network key 1.

S704. The target base station sends a handover command, including the key change indicator and the NAS container, to the core network device.

The handover command may be an RRC message.

S705. The core network device sends the handover command to the source base station.

S706. The source base station sends the handover command to the terminal.

S707. The terminal starts a first timer, derives the core network key 1 based on the NAS container in the handover command, and derives the access network key 1 based on the key change indicator and the core network key 1.

For S707, refer to the foregoing description of S507. Details are not described herein again.

S708. If the terminal fails in a reconfiguration or a handover, the terminal reverts back to (revert back to) a source configuration.

For S708, refer to the foregoing description of S508. Details are not described herein again.

S709. After the terminal reverts back to the source configuration, the terminal performs cell selection, and sends a connection reestablishment request to a selected base station.

For S709, refer to the foregoing description of S509. Details are not described herein again.

Optionally, when the selected base station is another station different from the source base station, and the target base station, steps of S710 to S711 are performed after S709.

Optionally, when the selected base station is the target base station or the source base station, S712 is performed after S709.

S710. The selected base station sends a context request to the source base station.

S711. The source base station sends a terminal context to the selected base station.

Optionally, if the source base station obtains the first access network key derivation parameter and the NAS container in S705, the terminal context includes at least one of the following information: an identifier (for example, an AMF UE NGAP ID) allocated by a source core network to the terminal, the first access network key derivation parameter, the second access network key derivation parameter, the NAS container, and second security check information. Herein, the second security check information is obtained by the source base station based on the source access network key.

Optionally, if the source base station does not obtain the first access network key derivation parameter and the NAS container in S705, the terminal context includes at least one of the following information: an identifier (for example, an AMF UE NGAP ID) allocated by a source core network to the terminal, second security check information, and the second access network key derivation parameter. Herein, the second security check information is obtained by the source base station based on the source access network key. The second access network key derivation parameter includes at least one of the following information: a first derivation parameter (referred to as a source first derivation parameter for short) of the terminal that is stored before the source base station initiates the handover procedure, a second derivation parameter (referred to as a source second derivation parameter) of the terminal that is stored before the source base station initiates the handover procedure, and an access network key 3 derived by the source base station based on the first derivation parameter, the second derivation parameter, and information about the selected base station (for example, a frequency and cell identifier information of the selected cell).

S712. The selected base station obtains the access network key 3 based on the second access network key derivation parameter.

Optionally, the selected base station performs a security check on the connection reestablishment request. After the security check succeeds, the selected base station obtains the access network key 3 based on the second access network key derivation parameter.

Optionally, the selected base station may check the connection reestablishment request based on the first security check information and the second security check information, or the selected base station may send the first security check information to the source base station, the source base station performs a security check, and the source base station notifies the selected base station of a security check result.

S713. The selected base station sends a connection reestablishment message, including the second access network key derivation parameter to the terminal.

S714. The terminal derives the access network key 3 based on the second access network key derivation parameter.

S715. The terminal sends a connection reestablishment complete message to the selected base station.

The connection reestablishment complete message may be an RRC connection reestablishment complete message or an RRC reestablishment complete message.

In this case, the terminal establishes a connection to the selected base station, but the key of the selected base station is different from that of the core network device. Therefore, the selected base station needs to obtain the first access network key derivation parameter and the NAS container that are of the core network device, so that the selected base station generates a new access network key (for example, the access network key 2) based on the first access network key derivation parameter.

Specifically, if the selected base station and the source base station are a same device, the selected base station may directly obtain the first access network key derivation parameter and the NAS container from the core network device, and then generate the new access network key based on the first access network key derivation parameter, that is, perform the following S716 to S720. If the selected base station and the target base station are a same device, the selected base station has obtained the first access network key derivation parameter and the NAS container, and may directly generate the new access network key based on the first access network key derivation parameter, that is, perform the following S721 to S723. If the selected base station is another base station different from the source base station and the target base station, the selected base station obtains the first access network key derivation parameter and the NAS container from the core network device, and then generates the new access network key based on the first access network key derivation parameter, that is, performs the following S724 to S728.

S716. The source base station sends a second message to the core network device.

S717. The core network device further sends the first access network key derivation parameter and the NAS container to the source base station.

S718. The source base station derives the access network key 2 based on the first key derivation parameter.

S719. The source base station sends a first message, including the NAS container, to the terminal.

S720. The terminal sends the NAS container to the NAS, derives the core network key 1, and derives the access network key 2 based on the core network key 1, thereby implementing communication with the selected base station (that is, the source base station).

S721. The target base station derives the access network key 2 based on the first access network key derivation information.

S722. The target base station sends the first message, including the NAS container, to the terminal.

S723. The terminal sends the NAS container to the NAS, derives the core network key 1, and derives the access network key 2 based on the core network key 1, thereby implementing communication with the selected base station (that is, the target base station).

S724. The selected base station sends a third message to the core network device.

S725. The core network device further sends the first access network key derivation parameter and the NAS container to the selected base station.

S726. The selected base station derives the access network key 2 based on the first key derivation parameter.

S727. The selected base station sends the first message, including the NAS container, to the terminal.

S728. The terminal sends the NAS container to the NAS, derives the core network key 1, and derives the access network key 2 based on the core network key 1, thereby implementing communication with the selected base station.

In the method procedure shown in FIG. 7A, FIG. 7B, and FIG. 7C, the connection between the terminal and the selected base station is first established, and after the reestablishment succeeds, the NAS container is obtained, so that the terminal updates the core network key. Finally, the access network key or the core network key of the terminal, the selected base station, and the core network device is the same. In this way, even in a scenario in which the core network device updates the core network key in the handover procedure of the terminal, and the terminal fails to be handed over, the connection reestablishment of the terminal may also be completed.

An embodiment of this application provides a communications apparatus 8. The communications apparatus 8 may be a terminal, or may be an apparatus as a part in a terminal, for example, a chip system in the terminal. Optionally, the chip system is configured to support the terminal in implementing a function in the foregoing method embodiments, for example, receiving, sending, or processing data and/or information in the foregoing methods. The chip system includes a chip, or may further include another discrete component or circuit structure.

The communications apparatus 8 is configured to perform the steps performed by the terminal in the foregoing connection reestablishment method. The communications apparatus 8 provided in this embodiment of this application may include modules corresponding to corresponding steps.

In this embodiment of this application, the communications apparatus 8 may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. In this embodiment of this application, division into the modules is an example, and is merely logical function division. There may be another division manner in actual implementation.

Figure 8:
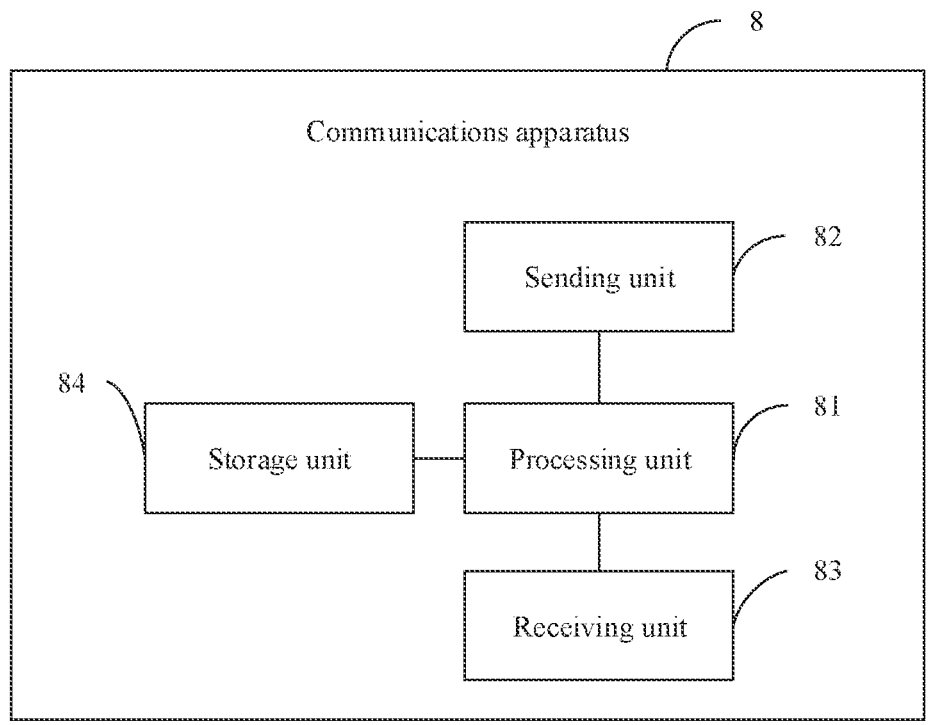
FIG. 8 is a schematic structural diagram 1 of a communications apparatus according to an embodiment of this application.

When each functional module is obtained through division based on each corresponding function, FIG. 8 is a possible schematic structural diagram of the communications apparatus 8 in this embodiment of this application. As shown in FIG. 8, the communications apparatus 8 includes a processing unit 81, a sending unit 82, and a receiving unit 83.

The processing unit 81 is configured to support the communications apparatus 8 in performing operations such as reverting back, deriving, and obtaining, shown in FIG. 5A and FIG. 5B to FIG. 7A, FIG. 7B, and FIG. 7C, for example, S507, S508, S509, S514, S521, S607, S608, S609, S614, S707, S708, S709, S714, S720, S723 and S728, and/or another process used for the technology described in this specification.

The sending unit 82 is configured to support the communications apparatus 8 in performing the sending operations shown in FIG. 5A and FIG. 5B to FIG. 7A, FIG. 7B, and FIG. 7C, for example, S509, S517, S609, S709, and S715, and/or another process used for the technology described in this specification.

The receiving unit 83 is configured to support the communications apparatus 8 in performing the receiving operations shown in FIG. 5A and FIG. 5B to FIG. 7A, FIG. 7B, and FIG. 7C, for example, S606, S613, S706, S713, S719, S722, and S727, and/or another process used for the technology described in this specification.

All content related to the steps in the foregoing method embodiments may be cited in function descriptions of corresponding functional modules. Details are not described herein again. Certainly, the communications apparatus 8 provided in this embodiment of this application includes but is not limited to the foregoing modules. For example, the communications apparatus 8 may further include a storage unit 84. The storage unit 84 may be configured to store program code and data of the communications apparatus 8.

For an entity block diagram of the communications apparatus 8 provided in this application, refer to FIG. 3. When the communications apparatus 8 is a mobile phone, the processing unit 81 may be the processor 301 in FIG. 3, the sending unit 82 and the receiving unit 83 may be antennas connected to the radio frequency circuit 302 in FIG. 3, and the storage unit 84 may be the memory 303 in FIG. 3.

Another embodiment of this application further provides a computer-readable storage medium. The computer-readable storage medium stores instructions. When the instructions are run on the communications apparatus 8, the communications apparatus 8 performs the steps of the terminal in the connection reestablishment method in the embodiments shown in FIG. 5A and FIG. 5B to FIG. 7A, FIG. 7B, and FIG. 7C.

In another embodiment of this application, a computer program product is further provided. The computer program product includes computer executable instructions, and the computer executable instructions are stored in a computer-readable storage medium. The processor of the communications apparatus 8 may read the computer executable instructions from the computer-readable storage medium, and the processor executes the computer executable instructions, so that the communications apparatus 8 performs the steps of the terminal in the connection reestablishment method in the embodiments shown in FIG. 5A and FIG. 5B to FIG. 7A, FIG. 7B, and FIG. 7C.

An embodiment of this application provides a communications apparatus 9. The communications apparatus 9 may be a base station, for example, an eLTE eNB or a gNB, or may be an apparatus as a part in a base station, for example, a chip system in the base station. Optionally, the chip system is configured to support the base station in implementing a function in the foregoing method embodiments, for example, receiving, sending, or processing data and/or information in the foregoing methods. The chip system includes a chip, or may further include another discrete component or circuit structure.

The communications apparatus 9 is configured to perform the steps performed by the selected base station in the foregoing connection reestablishment method. The communications apparatus 9 provided in this embodiment of this application may include modules corresponding to corresponding steps.

In this embodiment of this application, the communications apparatus 9 may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. In this embodiment of this application, division into the modules is an example, and is merely logical function division. There may be another division manner in actual implementation.

Figure 9:
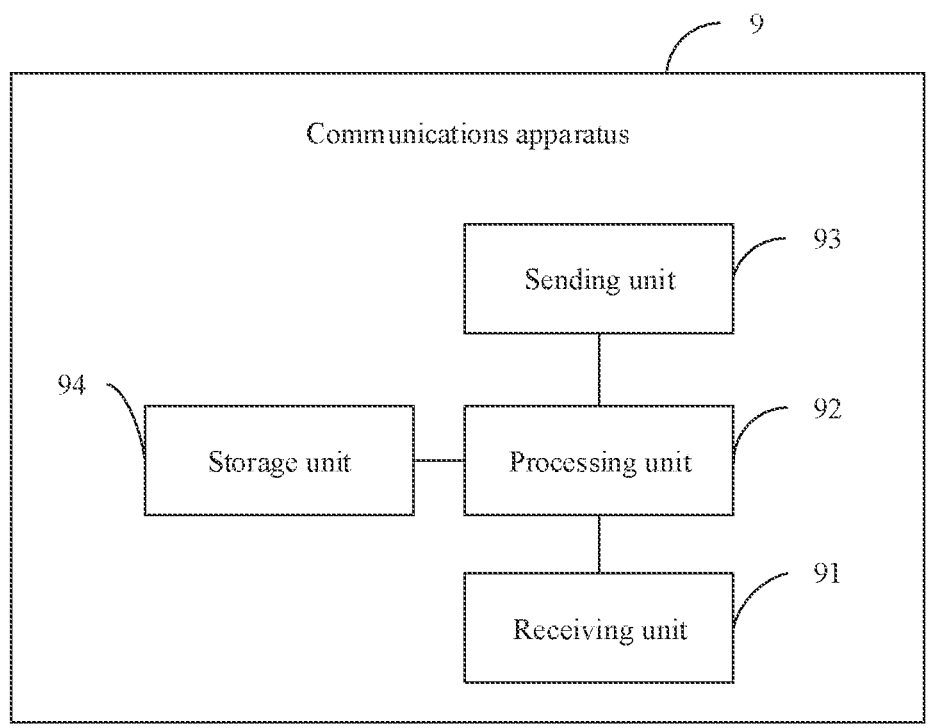
FIG. 9 is a schematic structural diagram 2 of a communications apparatus according to an embodiment of this application.

When each functional module is obtained through division based on each corresponding function. FIG. 9 is a possible schematic structural diagram of the communications apparatus 9. As shown in FIG. 9, the communications apparatus 9 includes a receiving unit 91, a processing unit 92, and a sending unit 93.

The receiving unit 91 is configured to support the communications apparatus 9 in performing the receiving operations shown in FIG. 5A and FIG. 5B to FIG. 7A, FIG. 7B, and FIG. 7C, for example, S509, S511, S517, S519, S609, S611, S709, S711, and S715, and/or another process used for the technology described in this specification.

The processing unit 92 is configured to support the communications apparatus 9 in performing the processing operations shown in FIG. 5A and FIG. 5B to FIG. 7A, FIG. 7B, and FIG. 7C, for example, S512, S515, S520, S612, S712, and S726, and/or another process used for the technology described in this specification.

The sending unit 93 is configured to support the communications apparatus 9 in performing the sending operations shown in FIG. 5A and FIG. 5B to FIG. 7A, FIG. 7B, and FIG. 7C, for example, S510, S513, S516, S518, S520, S610, S613, S710, S713, and S727, and/or another process used for the technology described in this specification.

Certainly, the communications apparatus 9 provided in this embodiment of this application includes but is not limited to the foregoing modules. For example, the communications apparatus 9 may further include a storage unit 94. The storage unit 94 may be configured to store program code of the communications apparatus 9. All content related to the steps in the foregoing method embodiments may be cited in function descriptions of corresponding functional modules. Details are not described herein again.

When the communications apparatus 9 is a base station, the processing unit 92 may be the processor 41 in FIG. 4, the sending unit 93, and the receiving unit 91 may be the transceiver 43 in FIG. 4, and the storage unit 94 may be the memory 42 in FIG. 4.

Another embodiment of this application further provides a computer-readable storage medium. The computer-readable storage medium stores instructions. When the instructions are run on the communications apparatus 9, the communications apparatus 9 performs the steps of the selected base station in the connection reestablishment method in the embodiments shown in FIG. 5A and FIG. 5B to FIG. 7A, FIG. 7B, and FIG. 7C.

In another embodiment of this application, a computer program product is further provided. The computer program product includes computer executable instructions, and the computer executable instructions are stored in a computer-readable storage medium. The processor of the communications apparatus 9 may read the computer executable instructions from the computer-readable storage medium, and the processor executes the computer executable instructions, so that the communications apparatus 9 performs the steps of the selected base station in the connection reestablishment method in the embodiments shown in FIG. 5A and FIG. 5B to FIG. 7A, FIG. 7B, and FIG. 7C.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data terminal, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The foregoing descriptions about implementations allow a person skilled in the art to clearly understand that, for the purpose of convenient and brief description, division into the foregoing functional modules is only used as an example for description. In actual application, the foregoing functions can be allocated to different functional modules for implementation based on a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A connection reestablishment method, used in an application scenario in which a core network device updates a source core network key to a first core network key in a process in which a terminal is handed over from a source radio access network device to a target radio access network device, wherein the connection reestablishment method comprises:

when a reconfiguration fails or a handover fails, reverting, by the terminal, back to a source configuration, and obtaining a selected cell;

sending, by the terminal, a connection reestablishment request to a selected radio access network device, wherein the selected radio access network device provides a service for the selected cell;

receiving, by the terminal, a first message from the selected radio access network device, wherein the first message comprises indication information, and wherein the indication information is used to indicate to derive an access network key based on a core network key;

obtaining, by the terminal, the first core network key based on the indication information, and deriving a first access network key based on the first core network key; and communicating, by the terminal, with the selected radio access network device by using the first access network key;

wherein reverting, by the terminal, back to the source configuration comprises reverting an access network key of the terminal back to a source access network key, and the source access network key is derived by the terminal based on the source core network key;

wherein the connection reestablishment method further comprises:

sending, by an access stratum (AS) of the terminal, an indication message to a non-access stratum (NAS) of the terminal, wherein the indication message is used to indicate to revert the core network key back to the source core network key; and reverting, by the NAS of the terminal, the first core network key back to the source core network key;

wherein the first message is a connection reestablishment message or a reconfiguration message, the indication information is a NAS container, and the NAS container is obtained by the selected radio access network device from the core network device; and wherein obtaining, by the terminal, the first core network key based on the indication information comprises deriving, by the terminal, the first core network key based on the NAS container.

2. The connection reestablishment method according to claim 1, wherein if the first message is the reconfiguration message, before receiving, by the terminal, the first message from the selected radio access network device, the connection reestablishment method further comprises:

receiving, by the terminal, the connection reestablishment message from the selected radio access network device, wherein the connection reestablishment message comprises a first derivation parameter;

deriving, by the terminal, a second access network key based on the first derivation parameter, wherein the first derivation parameter is used to indicate to derive the second access network key based on the source access network key or a third derivation parameter; and sending, by the terminal to the selected radio access network device, a connection reestablishment complete message on which security protection is performed by using the second access network key.

3. The connection reestablishment method according to claim 1, wherein reverting, by the terminal, back to the source configuration indicates that an access network key of the terminal is reverted back to a source access network key, and a core network key of the terminal remains as the first core network key, wherein the source access network key is derived by the terminal based on the source core network key, wherein the first message is a connection reestablishment message, and wherein the indication information comprises at least one of a first derivation parameter or a key change indicator.

4. A communications apparatus, used in an application scenario in which a core network device updates a source core network key to a first core network key in a handover process from a source radio access network device to a target radio access network device, wherein the communications apparatus comprises;

at least one processor; and one or more memories coupled to the at least one processor and storing programming instructions for execution by the at least one processor to perform operations comprising:

when a reconfiguration fails or a handover fails, reverting back to a source configuration, and obtaining a selected cell;

sending a connection reestablishment request to a selected radio access network device, wherein the selected radio access network device provides a service for the selected cell;

receiving a first message from the selected radio access network device, wherein the first message comprises indication information, and wherein the indication information is used to indicate to derive an access network key based on a core network key;

obtaining the first core network key based on the indication information, and deriving a first access network key based on the first core network key; and communicating with the selected radio access network device by using the first access network key;

wherein reverting back to the source configuration comprises reverting an access network key of the communications apparatus back to a source access network key, and the source access network key is derived from the source core network key;

wherein the operations further comprise:

sending by an access stratum (AS) of the communications apparatus, an indication message to a non-access stratum (NAS) of the communications apparatus, wherein the indication message is used to indicate to revert the core network key back to the source core network key; and reverting, by the NAS of the communications apparatus, the first core network key back to the source core network key;

wherein the first message is a connection reestablishment message or a reconfiguration message, the indication information is a NAS container, and the NAS container is obtained by the selected radio access network device from the core network device; and wherein the operations further comprise deriving the first core network key based on the NAS container.

5. The communications apparatus according to claim 4, wherein if the first message is the reconfiguration message, before receiving the first message from the selected radio access network device, the operations further comprise:

receiving the connection reestablishment message from the selected radio access network device, wherein the connection reestablishment message comprises a first derivation parameter;

deriving a second access network key based on the first derivation parameter, wherein the first derivation parameter is used to indicate to derive the second access network key based on the source access network key or a third derivation parameter; and sending, to the selected radio access network device, a connection reestablishment complete message on which security protection is performed by using the second access network key.

6. The communications apparatus according to claim 4, wherein reverting back to the source configuration comprises reverting an access network key of the communications apparatus back to a source access network key, wherein a core network key remains as the first core network key, wherein the source access network key is derived based on the source core network key, wherein the first message is a connection reestablishment message, and wherein the indication information comprises at least one of a first derivation parameter or a key change indicator.

* * * * *

UNITED STATES PATENT AND TRADEMARK OFFICE
CERTIFICATE OF CORRECTION

| | |
|---|---|
| PATENT NO. | : 11,671,884 B2 |
| APPLICATION NO. | : 17/245183 |
| DATED | : June 6, 2023 |
| INVENTOR(S) | : Rui Wang et al. |

It is certified that error appears in the above-identified patent and that said Letters Patent is hereby corrected as shown below:

In the Claims

Column 35/Line 41 - In Claim 4, delete "comprises;" and insert -- comprises: --.

Column 36/Line 12 (Approx.) - In Claim 4, delete "sending" and insert -- sending, --.

Signed and Sealed this
Fifth Day of September, 2023

*Katherine Kelly Vidal*

Katherine Kelly Vidal
*Director of the United States Patent and Trademark Office*